US009727326B2

(12) United States Patent
Ciudad et al.

(10) Patent No.: US 9,727,326 B2
(45) Date of Patent: Aug. 8, 2017

(54) PROVIDING CUSTOMIZED NOTIFICATIONS FOR SECURITY SOFTWARE UPDATES

(71) Applicant: Apple Inc., Cupertino, CA (US)

(72) Inventors: Jean-Pierre Ciudad, San Francisco, CA (US); Daniel I. Feldman, San Francisco, CA (US); Patrick L. Coffman, San Francisco, CA (US); Laurent Baumann, Campbell, CA (US); Jack R. Matthew, San Francisco, CA (US); Randy D. Saldinger, Seattle, WA (US)

(73) Assignee: APPLE INC., Cupertino, CA (US)

( * ) Notice: Subject to any disclaimer, the term of this patent is extended or adjusted under 35 U.S.C. 154(b) by 255 days.

(21) Appl. No.: 13/841,905

(22) Filed: Mar. 15, 2013

(65) Prior Publication Data

US 2014/0282476 A1 Sep. 18, 2014

(51) Int. Cl.
*G06F 9/44* (2006.01)
*G06F 9/445* (2006.01)

(52) U.S. Cl.
CPC .................... *G06F 8/65* (2013.01)

(58) Field of Classification Search
USPC ......................................................... 717/171
See application file for complete search history.

(56) References Cited

U.S. PATENT DOCUMENTS

| 2002/0184619 A1 | 12/2002 | Meyerson |
| 2003/0179239 A1 | 9/2003 | Lira |
| 2004/0003266 A1 | 1/2004 | Moshir et al. |
| 2004/0040021 A1 | 2/2004 | Bharati et al. |
| 2004/0061713 A1 | 4/2004 | Jennings |
| 2004/0181787 A1 | 9/2004 | Wickham et al. |
| 2005/0246658 A1 | 11/2005 | Uemura et al. |
| 2006/0048134 A1* | 3/2006 | Napier et al. .................. 717/169 |

(Continued)

FOREIGN PATENT DOCUMENTS

WO PCT/US2013/077725 12/2013

OTHER PUBLICATIONS (Internet article: Download Offline Hotfixes and Patches with Windows Updates Downloader, dated 2012, retrieved on Apr. 8, 2015, URL: https://www.raymond.cc/blog/windows-updates-downloader/).*

(Continued)

*Primary Examiner* — Hang Pan
(74) *Attorney, Agent, or Firm* — Morgan, Lewis & Bockius LLP

(57) ABSTRACT

A method of providing customized software update notifications for a device is described. The method receives information for a set of available system software updates from an update server. The set of available system software updates includes a set of security updates. Each security update includes a set of metadata. The method also receives information for a set of available application software updates. The method determines the total number of available application and system software updates. The method generates a customized update notification string based on the received metadata and the total number of available software updates. The method displays the generated customized update notification string.

18 Claims, 22 Drawing Sheets

(56) References Cited

U.S. PATENT DOCUMENTS

| | | | |
|---|---|---|---|
| 2007/0006219 A1 | 1/2007 | Sinha et al. | |
| 2007/0033652 A1* | 2/2007 | Sherwani | G06F 8/65 726/26 |
| 2009/0307105 A1* | 12/2009 | Lemay | G06F 8/61 705/26.1 |
| 2012/0072895 A1* | 3/2012 | Koyama et al. | 717/168 |
| 2012/0144382 A1 | 6/2012 | Matthew et al. | |
| 2014/0047425 A1 | 2/2014 | Thapar et al. | |
| 2014/0282480 A1 | 9/2014 | Matthew et al. | |

OTHER PUBLICATIONS

Web article (Updating WordPress, dated Mar. 29, 2011, URL:http://www.codeease.com/updating-wordpress.html, retrieved on Jan. 19, 2017).*

U.S. Appl. No. 13/841,810, filed Mar. 15, 2013, Apple Inc.

International Search Report and Written Opinion for PCT/US2013/077725, Mar. 24, 2014 (mailing date), Apple Inc.

Author Unknown, "Simple package management with Synaptic Package Manager in Ubuntu", Nov. 16, 2006, 22 pages, available at http://www.debianadmin.com/simple-package-management-with-synaptic-package-manager-in-ubuntu.html.

Raymond, "Patches with Windows Updates Downloader", https://www.raymond.cc/blog/windows-updates-downloader, Apr. 8, 2015, 6 pages.

Office Action, dated Apr. 16, 2015, received in U.S. Appl. No. 13/841,810, 15 pages.

Final Office Action, dated Nov. 19, 2015, received in U.S. Appl. No. 13/841,810, 12 pages.

Office Action, dated Jul. 19, 2016, received in U.S. Appl. No. 13/841,810, 13 pages.

Final Office Action, dated Nov. 1, 2016, received in U.S. Appl. No. 13/841,810, 14 pages.

Notice of Allowance, dated Feb. 2, 2017, received in U.S. Appl. No. 13/841,810, 16 pages.

International Preliminary Report on Patentability, Sep. 15, 2015, received in International Patent Application No. PCT/US2013/077725, which corresponds with U.S. Appl. No. 13/841,810, 7 pages.

* cited by examiner

PROVIDING CUSTOMIZED NOTIFICATIONS FOR SECURITY SOFTWARE UPDATES

BACKGROUND

Software update is a mechanism to notify users that updates are available for an electronic device. If automatic checking for updates area allowed on a device, the user gets an alert on the screen when there are updates available. The user can either install an update using the alert or request to see more details. The request to see more details opens a window provides more details about the update. Alternatively, the user can manually check for available software updates.

Since updates come from different sources such as the operating system vendor and different application vendors, there are different user interfaces to show different updates, which cause users confusion. In addition, software update authors do not have a uniform way of providing, critical security updates to a user device, communicating the urgency of the updates, and streamlining the installation of these updates.

BRIEF SUMMARY

Some embodiments provide a unified software update center to display all available software updates including security updates, non-security system software updates, and application software updates. The unified software update center also provides tools for checking for more updates and installing individual or groups of updates. Security updates are shown as a separate list of items in the update center screen to differentiate the security updates from other software updates. In some embodiments, a subset of security updates is identified as critical security updates. In other embodiments, all security updates are treated as critical updates. In all these embodiments, the critical security updates (being all security updates or a subset that are identified as critical updates) are treated with more urgency than other updates.

The availability of critical security updates is checked more often than other updates. The critical security updates are notified to the user more frequently than other updates in some embodiments. The critical updates are displayed or announced more prominently (e.g., with different colors, fonts, icons, sounds, etc.) than other updates. Also, depending on the user preferences and whether an update requires restarts, some critical security updates are automatically installed on the client device.

In some embodiments, security updates include additional associated metadata that facilitate the urgent treatment of these updates. When a client device sends the identification (or list) of system software installed in the device to a system software update server, the system software update server provides a list of updates that are available for the system software currently installed on the device. This list includes metadata that are associated with the updates.

The metadata for an update include title, subtitle or text of the update, a countdown to auto install, an indication whether the update is critical, an indication whether the update requires restart, title and text for post install notification, etc. The metadata information is used to generate notification and post installation strings, determine whether an update has to be installed immediately or with a delay, determine whether a restart is needed, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
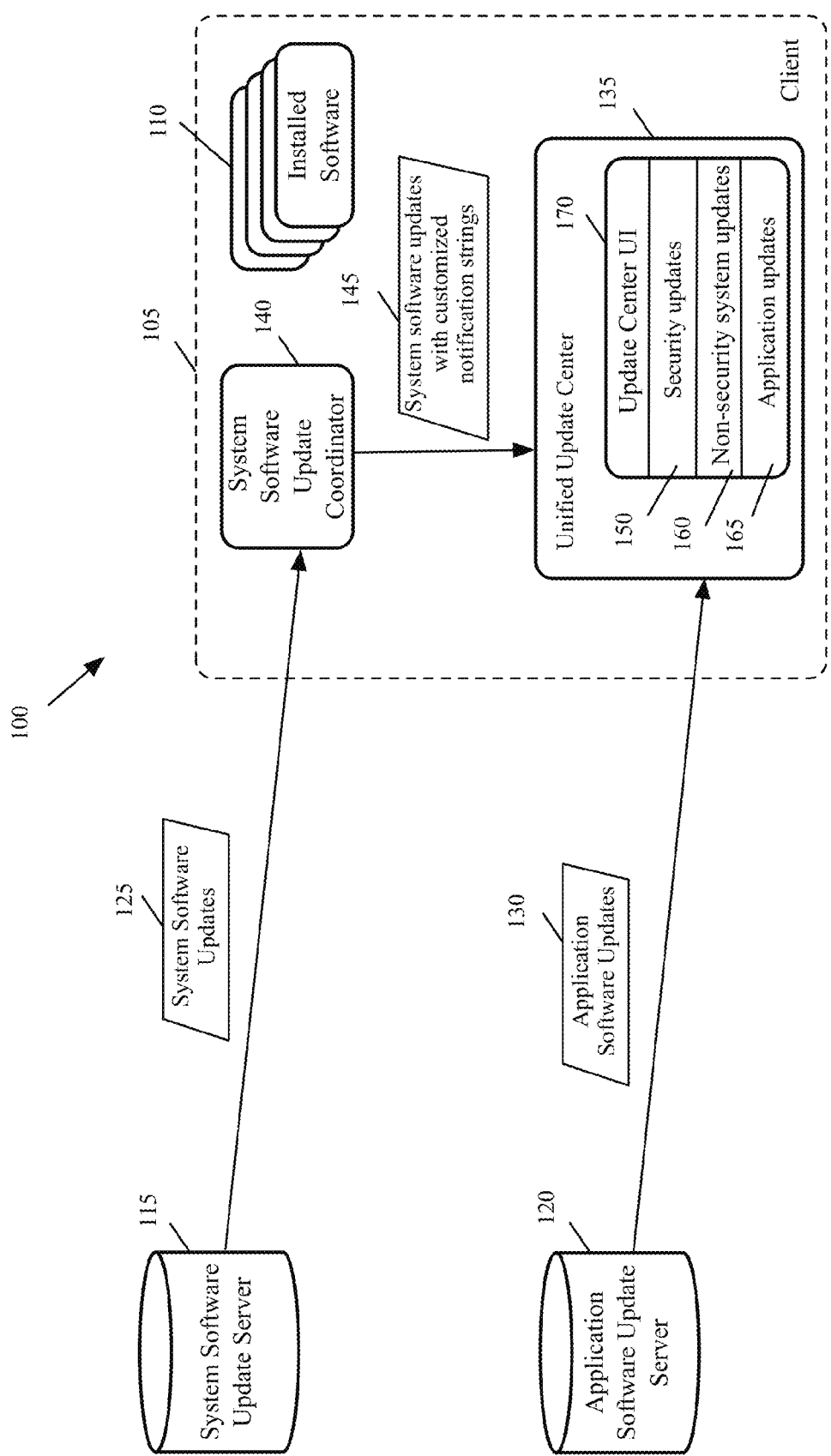
FIG. 1 conceptually illustrates a system for receiving, reporting, and installing software updates for a client device in some embodiments of the invention.

FIG. 1 conceptually illustrates a system 100 for receiving, reporting, and installing software updates for a client device in some embodiments of the invention. As shown, the client device 105 has several software programs 110 installed. The software programs include system software such as the operating system as well application software.

The client device receives software updates from two sets of update servers 115 and 120 through a network such as the Internet (not shown). Each set of update servers includes one or more servers. Only one server in each set is shown and is referred to throughout this Specification for simplicity. Update server 115 provides updates for system level software such as the operating system, device drivers, basic input/output system (BIOS), device firmware, etc. To preserve simplicity and brevity, the term system software (or system level software) in this Specification is used to refer to both system software and system firmware. System level software is designed to operate and control the computer hardware and to provide a platform for running application software. Some of system level software updates relate to security updates while other system level software updates are bug fixes, upgrades, new drivers, etc., which are not security updates. In addition, some of security updates are critical high-priority (or code red) security updates. These updates either have to be immediately installed, have a count down (or delay) to install, or have no count down to install but are more persistently shown to the user to encourage the user to install them. In addition, some high priority updates may require a restart.

Update server 120 provides updates for application software. Application software is designed to help the user to perform specific tasks. Application software may be provided by the same vendor as the operating system or by different vendors referred to as third party vendors. In some embodiments, a client device includes an application (such as the App Store or application store described further below) through which a user can purchase (or acquire for free) software applications. In these embodiments, this application coordinates purchase, download, and updates for the application software. In some embodiments, this application also provides a unified update center 135 for displaying and installing all available updates for the system and application software installed on the device.

Depending on the user preferences setup on the client device 105, the client device either periodically or upon the user command requests the update servers 115 and 120 for a list of available updates. In some embodiments application software update server 120 receives software updates from different application vendors and provides them to client devices. The client device sends a request for a list of available application software updates to the application software update server 120. The application software update server provides a list of all available software updates to the client device. The client device determines the updates that are applicable to the software currently updated on the client device. The client device requests one or more updates and receives the updates from the server. Depending on the preferences set on the client device 105, the software updates are either automatically downloaded to the client device to facilitate quick installation of the updates or the updates are downloaded upon receiving a command from the user.

As shown in the example of FIG. 1, the list 130 of all available application software is received from the application software update sever 130 by the unified update center 135 and a list 165 of the application software updates that are applicable to the client device is displayed on the user interface 170.

The client device also sends requests for a list of available system software updates to the system software update server 115. The system software update server provides a list 125 of all available system software updates to the client device. The client device determines the updates that are applicable to the software currently updated on the client device. The client device then requests one or more updates. Depending on the preferences set on the client device 105, the software updates are either automatically downloaded to the client device or the updates are downloaded upon receiving a command from the user. In some embodiments, the client device requests for critical security updates more often than other software updates. The client then receives the requested updates from the server. As shown the example of FIG. 1, system software update server 115 provides a list of the available system software updates 125 to an application (e.g., the system software update coordinator 140) in the client device 105.

As described further below, system level security updates include metadata to indicate the title, subtitle (or text), whether the update is critical (or code red), whether a restart is required, countdown, etc. A system software update coordinator application 140 on the client device receives the list of updates 125, prepares a portion of the page displayed on the user interface 170. This portion of the page includes information about the available security updates and other system software updates. The user interface 170 provides a unified interface to display the security related system software updates 150, non-security system software updates 160, and the application software updates 165.

In some embodiments, the system software update coordinator application 140 uses the received metadata as well as other information such as how many updates are received, how many updates have been received previously that are not installed yet, etc., to generate customized notification strings to display on the user device. The system software update coordinator application 140 also generates post install customized notification strings. The customized notifications 145 for the system software update are sent to the update center 135 to display on a user interface 170.

Although system 100 was described to include one set of servers 115 as system software update servers and a separate set of servers 120 as application software update server, in other embodiments the same set of servers are used both for system software updates as well as application software updates without deviating from the teachings of the invention. For instance, in some embodiments, the same set of servers provide the list of application software updates 130 to the unified update center 135 and provide the list of system software updates 125 to the system software update coordinator 140.

Figure 2:
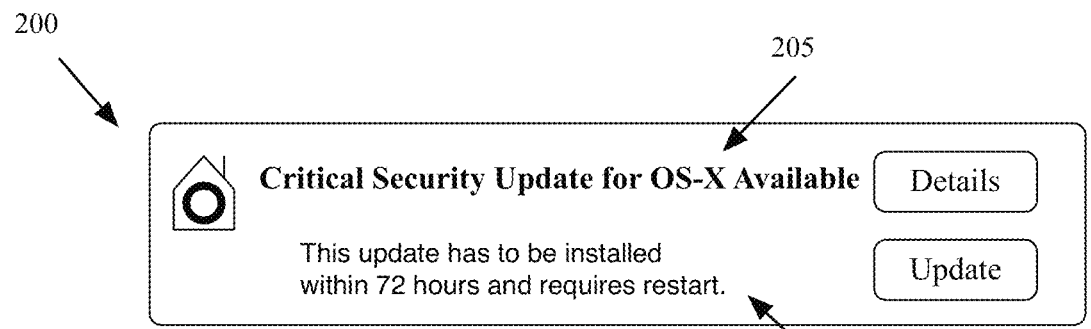
FIG. 2 illustrates an example of a customized notification string, which is displayed when an available critical security system software update includes metadata for a specific update notification.
Figure 3:
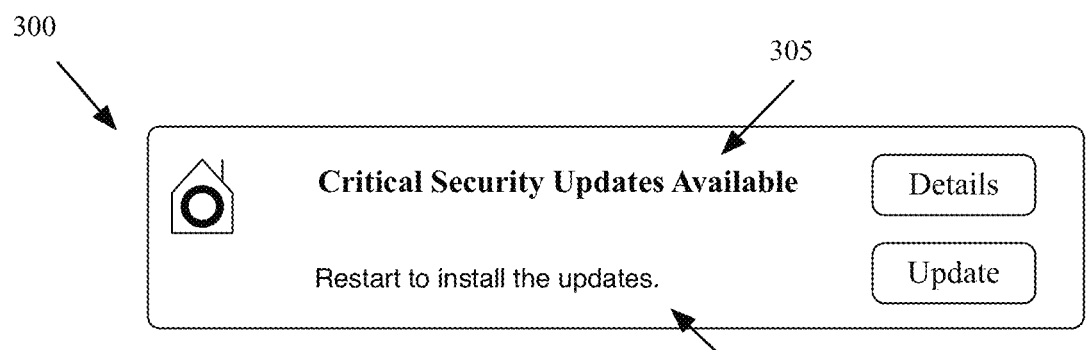
FIG. 3, on the other hand, illustrates an example of a customized notification string, which is displayed when multiple critical security updates are available.

FIGS. 2 and 3 illustrate examples of customized notification string in some embodiments of the invention. In these examples, the notifications are displayed as pop up on a device display screen. FIG. 2 illustrates an example of a customized notification 200, which is displayed when an available critical security system software update includes metadata for specific update notification title 205 and text 210. In some embodiments, the notification included in a critical security update metadata is displayed when the critical security update is the only critical update currently available to install.

FIG. 3, on the other hand, illustrates an example of a customized notification 300, which is displayed when multiple critical security updates are available. In some embodiments, the title 305 and the text 310 of a notification such as 300 is selected from a set of default notification strings when more than one critical security updates are available, regardless of whether any of the updates include metadata for specific update notification.

Several more detailed embodiments of the invention are described in sections below. Section I describes different methods for updating software installed on a client device in some embodiments. Next, Section II describes the software architecture for providing software updates in some embodiments of the invention. Finally, a description of an electronic system with which some embodiments of the invention are implemented is provided in Section III.

I. Updating Software Installed on a Client Device

A. Requesting and Receiving Software Updates

In some embodiments, system software updates and application software updates are requested and subsequently received from different servers. System software updates are received from a set of servers that provide the system level software updates such as updates to operating system, device drivers, BIOS, device firmware, etc. On the other hand, application software updates are collected by a set of servers that collect application software updates from different vendors and provide the updates to client devices. In other embodiments, all updates are collected and distributed by the same set of servers. For these embodiments, any references to the system software or application software update server in this Specification refer to the same set of servers.

In some embodiments, the client device requests a list of available software updates from the update servers. The client then receives the list of available software updates. For instance, in some embodiments, the client receives the list as a set of metadata over a secure connection such as https. Based on the specific software or firmware system currently installed on the client device, the client device requests for appropriate software updates.

In some embodiments, the update servers maintain a catalog of all released updates for each version of different software that the update servers provide to client devices. For instance, for an operating system named OS-A with the latest version 3.5, the system software update server maintains a list of all previous updates for different versions of the operating system from version 1.0 to version 3.5 (unless an update is removed or deactivated by the operating system vendor). The update server maintains a similar list for all versions of all other operating systems such as OS-B, ACME-OS, etc., that could be installed on different client devices. If the client device happens to have OS-A operating system, the client device compares the list of available updates and compares them with the currently installed version of the operating system. The client device then determines whether or not to request for one or more of the updates.

Once the update server receives a request to send the identified update for different system software and firmware for a particular device, the update server sends the requested updates (e.g., sends a distribution file for each update) to the particular device. The distribution file for each update includes metadata, which as described below, provide information about the particular update. When the device requests one or more of the available updates, the update server sends the actual payload for the update to be installed on the requesting device.

1. Automatic Request for Software and Firmware Updates

Figure 4A:
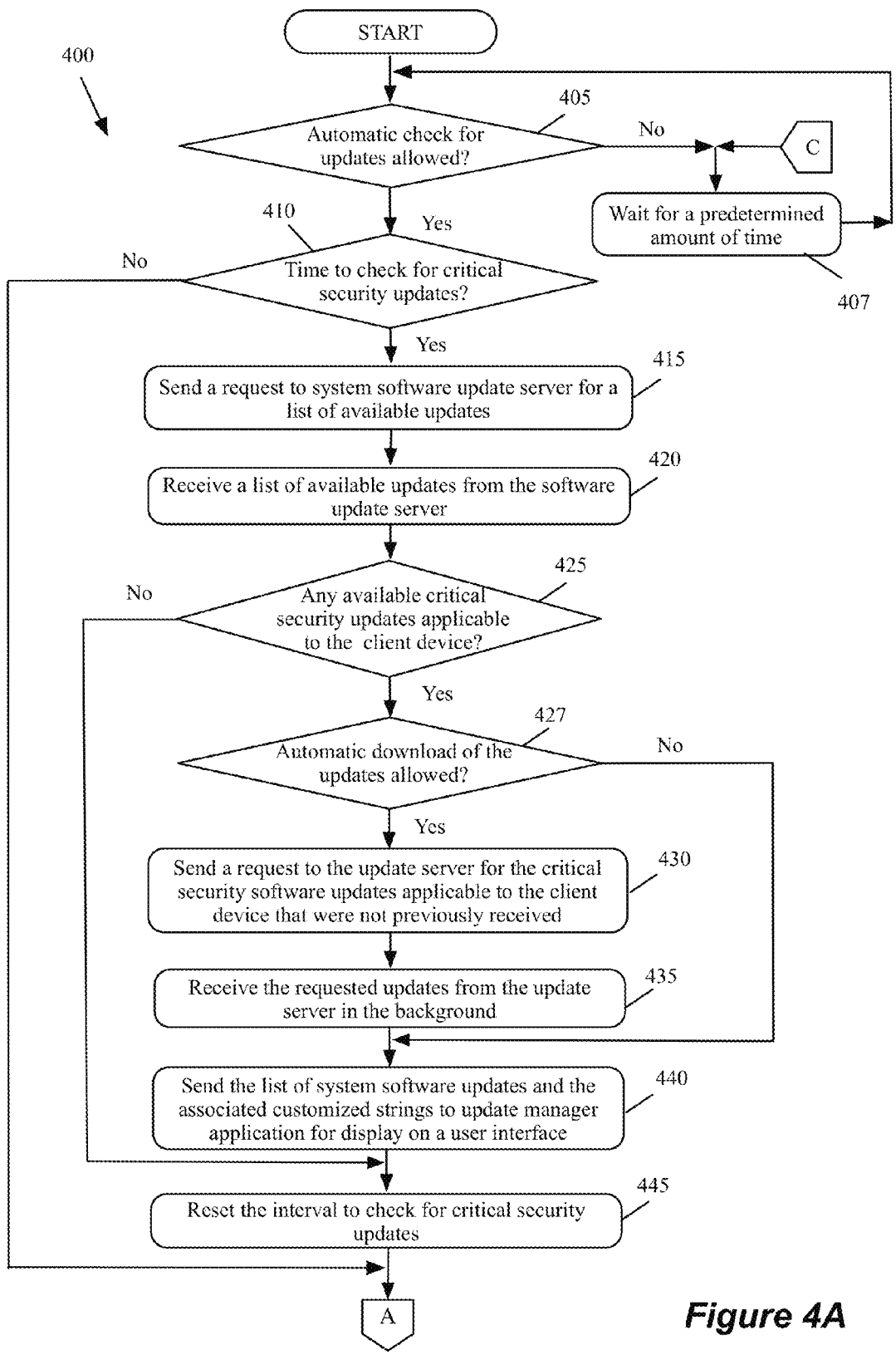
FIGS. 4A-4C conceptually illustrate a process for automatically requesting software and firmware updates from different update servers in some embodiments of the invention.
Figure 4B:
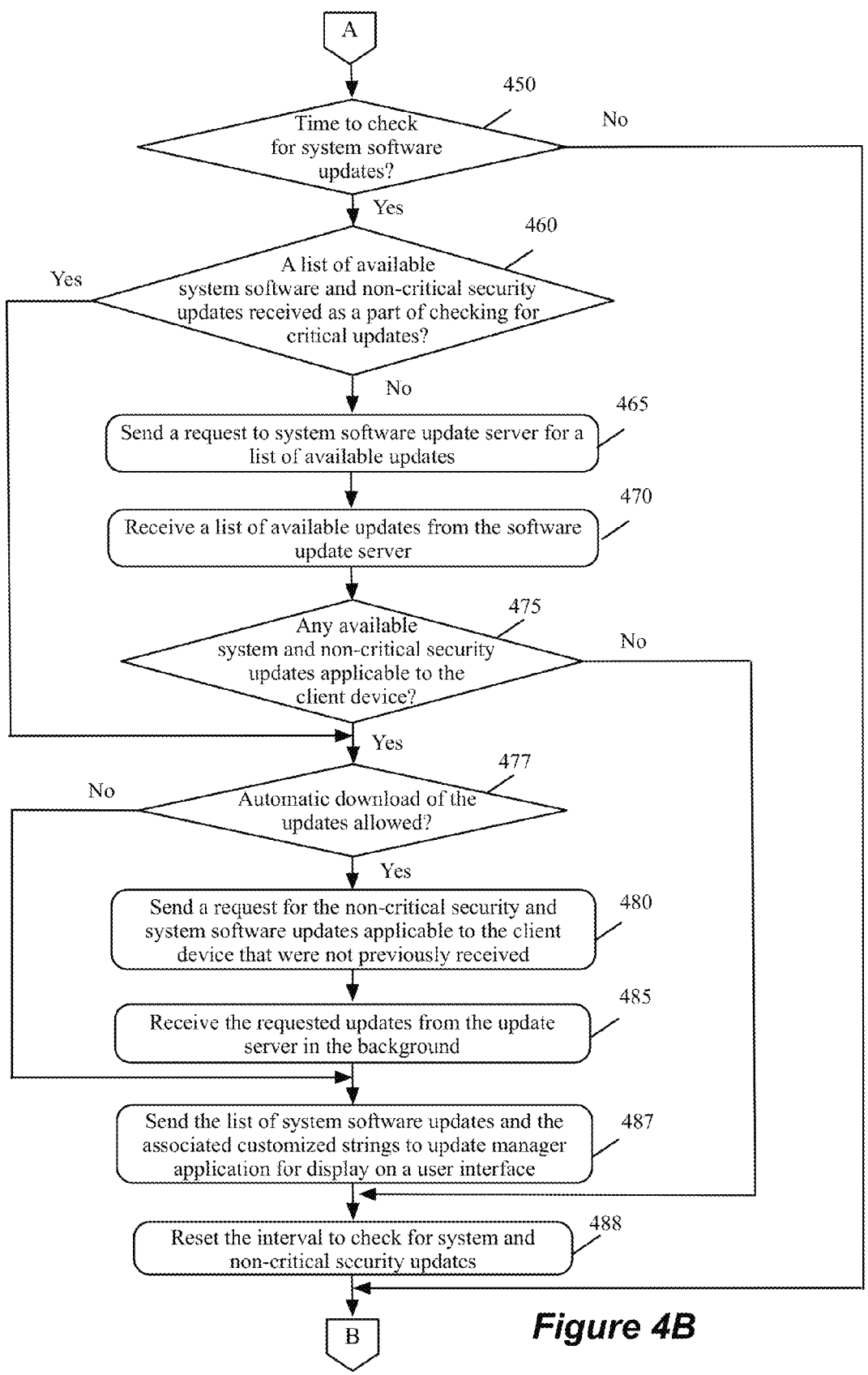
Figure 4C:
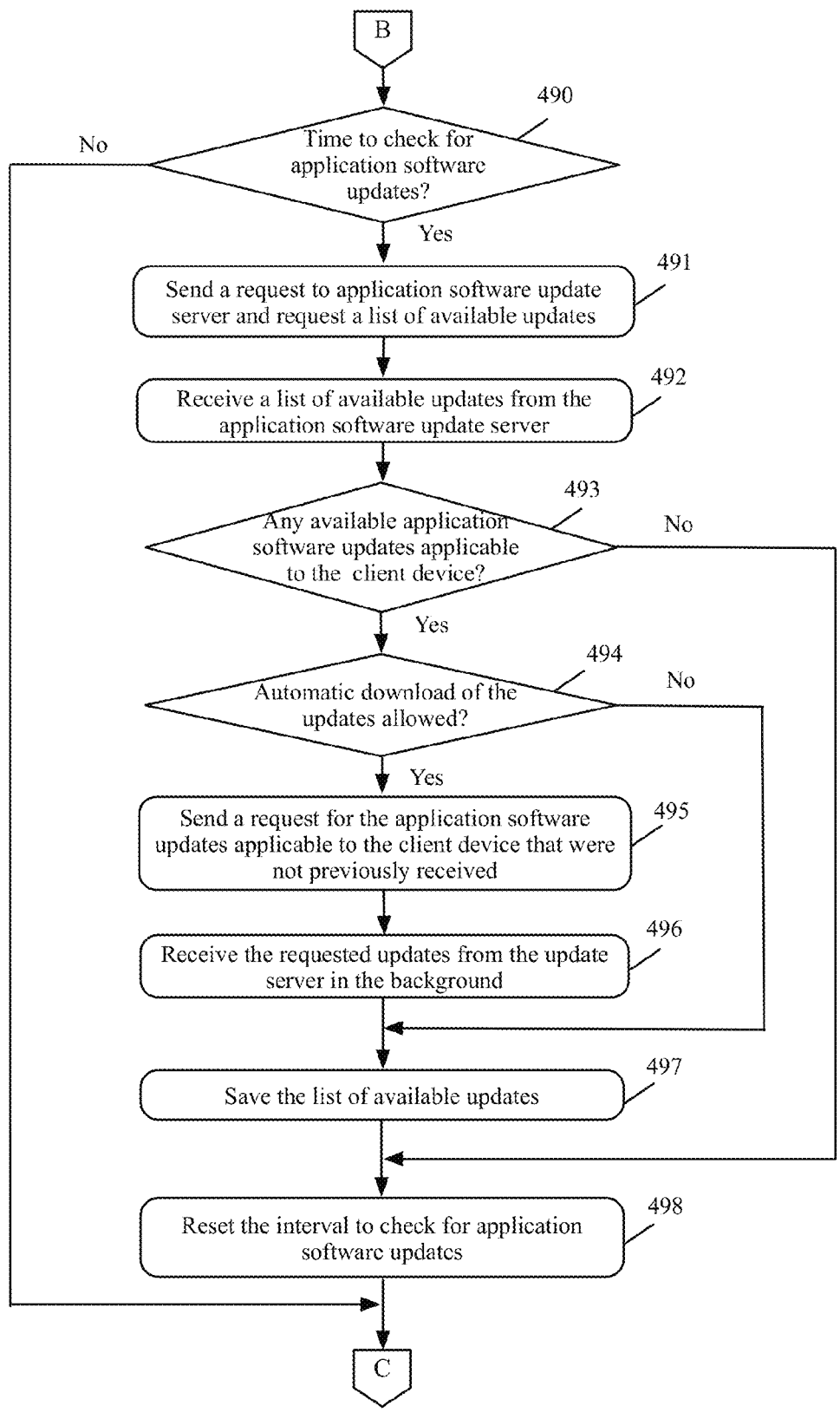

FIGS. 4A-4C conceptually illustrate a process 400 for automatically requesting software and firmware updates from different update servers in some embodiments of the invention. As described above, although process 400 and several other processes described further below refer to separate servers for receiving system and application software, both types of updates are provided from the same server or the same set of servers in some embodiments.

Figure 5:
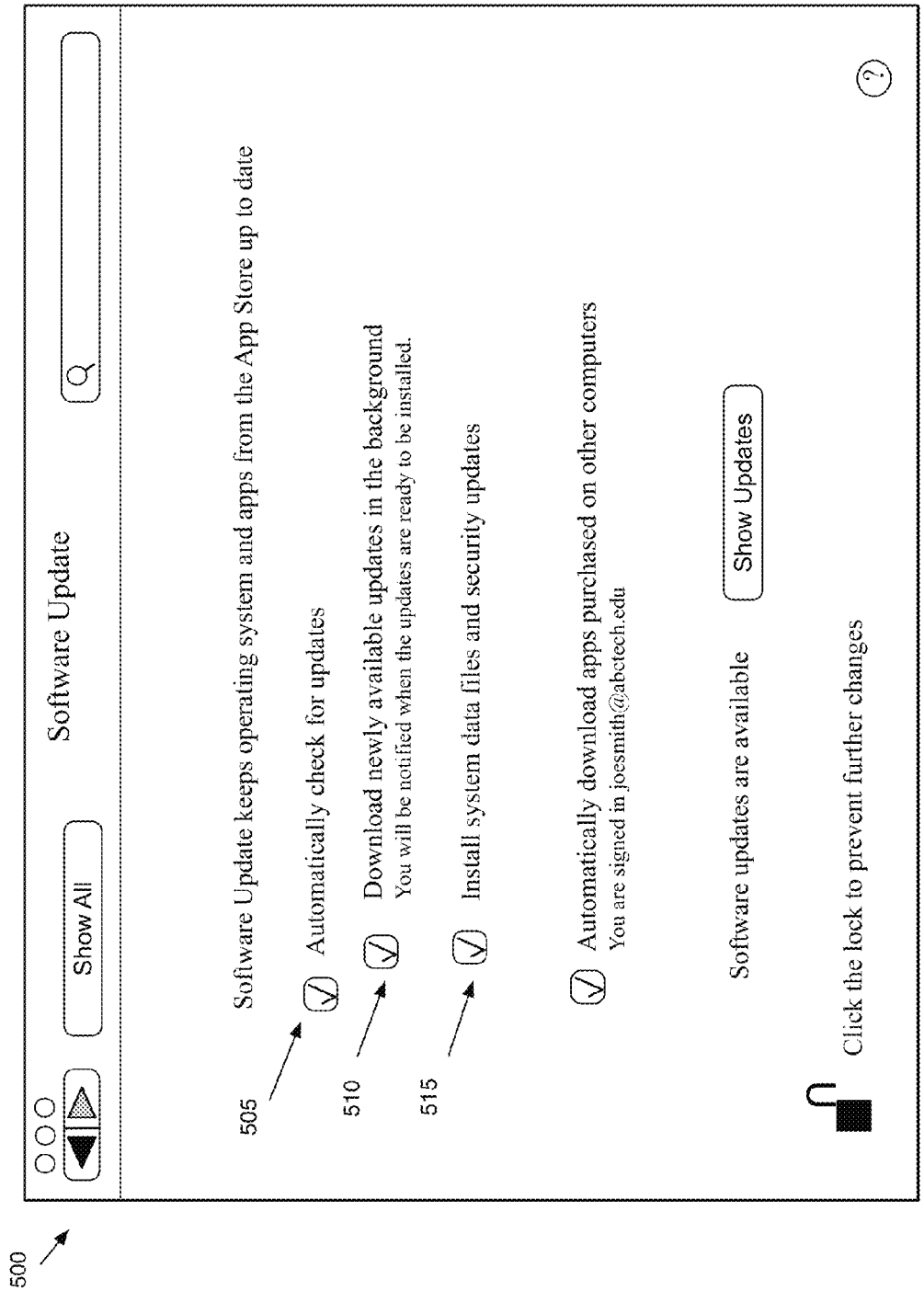
FIG. 5 illustrates a user interface for setting different options for software updates in some embodiments of the invention.

As shown, the process determines (at 405) whether automatic checks for updates are allowed. Some embodiments provide the user (or a system administrator) with an option to allow or prevent automatic checks for software updates. FIG. 5 illustrates a user interface for setting different options for software updates in some embodiments of the invention. As shown, the user interface 500 includes an option 505 for enabling or disabling automatic checks for software update.

When the automatic check for updates is not allowed, process 400 waits (at 407) a predetermined amount of time. The process then returns to 405, which was described above. Otherwise, the process determines (at 410) whether it is time to check for critical security updates. Some embodiments, check for the availability of different type of updates with different frequencies. The time interval for checking for the updates is reset once the update is checked. Some embodiments check for critical security updates more often than other updates. For instance, some embodiments check for critical security updates once a day while they check for other updates once a week. Some embodiments, determine the time interval for checking for each type of update by determining the elapsed time since the availability of the update was last checked. For instance, even if the power of the device is turned off, the actual date and time of the last check for updates is compared with the current date and time to determine whether it is time to check for the updates again. When the process determines that it is not time to check for critical security updates, the process proceeds to 450, which is described below.

Otherwise, the process sends (at 415) a request to system update server for a list of available updates. The process then receives (at 420) a list of available updates from the software update server. The process then determines (at 425) whether any critical security updates are applicable to the client device. For instance, the client device maintains the identification (e.g., name and version) of the client device system software and firmware and checks the list of available software updates for applicability to the software installed on the client device. When there are no applicable critical system security updates available, the process proceeds to 445, which is described below.

Otherwise, the process determines (at 427) whether the automatic download of the updates are allowed. As shown in FIG. 5, one of the options provided to the user or system administrator in some embodiments is an option 510 to allow the automatic download of the available updates in the background. The user is notified when the updates are ready to be installed. The option in some embodiments applies to downloading the system software updates as well as the application software updates. In other embodiments, the option only applies to system software updates.

When the automatic download of the updates is not allowed, process 400 proceeds to 440, which is described below. Otherwise, the process sends (at 430) a request to the update server for the critical security software updates that the client device has determined to be applicable. In some embodiments, any applicable updates that have been previously received but are not installed yet are stored in the client device for a period of time and are not requested for the server again as long as the updates are stored in the client device.

The process then receives (at 435) and stores the requested updates in background. In some embodiments, the update server provides the updates through a content distribution network such as Akamai® or Limelight®. The process then sends (at 440) the list of critical security software updates and the associated customized strings to an application on the client device (e.g., the system software update coordinator application 140) to prepare information regarding the updates for display on a user interface. The process then resets (at 445) the interval to check for critical security updates.

Next, the process then determines (at 450) whether it is time to check for non-critical security software or system software updates. In some embodiments, the critical security updates are requested more often than non-critical security updates or system software updates. If not, the process proceeds to 490, which is described below.

When the process determines that it is time to check for non-critical security software and system software updates, the process determines (at 460) whether the list of non-critical security software and system software updates is recently (e.g., within a predetermine time period) received as a part of checking for critical security updates. When the time to check for the critical security updates and other software updates coincide or is very close, process 400 uses the same list that was received from the system update server to determine the availability of applicable updates for critical security updates as well as non-critical-security and other system software updates. If the list of updates is already available, the process proceeds to 477, which is described below. Otherwise, the process sends (at 465) a request to system software update server for a list of available updates.

The process then receives (at 470) a list of available updates from the software update server. The process then determines (at 475) whether any system software updates or non-critical security updates are applicable to the client device. When there are no applicable updates available, the process proceeds to 488, which is described below.

Otherwise, the process determines (at 477) whether the automatic download of the updates are allowed. When the automatic download of the updates is not allowed, process 400 proceeds to 487, which is described below. Otherwise, the process sends (at 480) a request for the updates that the client device has determined to be applicable. In some embodiments, any applicable updates that have been previously received are stored in the client device for a period of time and are not requested for the server again as long as the updates are stored in the client device. Also, when the time to check for critical security software and the time to check for other system software coincide, process 400 in some embodiments sends one request to the updates server to receive the applicable updates.

The process then receives (at 485) and stores the requested updates in the background. The process then sends (at 487) the list of received updates and the associated customized strings to an application on the client device (e.g., the system software update coordinator application 140) to prepare information regarding the updates for display on a user interface. The process then resets (at 488) the interval to check for system and non-critical security updates.

The process then determines (at 490) whether it is time to check for application software updates. If not, the process proceeds to 407, which was described above. Otherwise, the process sends (at 491) a request to application update server for a list of available updates. The process then receives (at 492) a list of available application updates from the application update server. The process then determines (at 493) whether any application software updates are applicable to the client device. For instance, the client device maintains the identification (e.g., name and version) of the application software installed on the client device and checks the list of available software updates for applicability to the software installed on the client device.

When there are no applicable application software updates available, the process proceeds to 498, which is described below. Otherwise, the process determines (at 494) whether the automatic download of the application updates are allowed. When the automatic download of the updates is not allowed, process 400 proceeds to 497, which is described below. Otherwise, the process sends (at 495) a request for the updates that the client device has determined to be applicable. In some embodiments, any applicable updates that have been previously received but are not installed yet are stored in the client device for a period of time and are not requested for the server again as long as the updates are stored in the client device.

The process then receives (at 496) the requested updates in the background. The process then stores (497) the updates. The process then resets (at 498) the interval to check for application software updates. The process then proceeds to 407, which was described above.

The specific operations of process 400 may not be performed in one continuous series of operations, and different specific operations may be performed in different embodiments. Furthermore, the process could be implemented using several sub-processes, or as part of a larger macro process. For instance, requesting for security and other system software can be performed by one application (such as the system software update coordinator 140 shown in FIG. 1) while requesting for application software update can be performed by another application (such as application 135 shown in FIG. 1). In addition, when the time to check for critical security updates and other system software update coincide, some embodiments send one request for available updates to the system software update server and after determining the application updates send one request to the system software update server for all applicable critical security updates and other system updates.

2. User-Initiated Request for Software and Firmware Updates

Automatic checking for software updates was described by reference to process 400, above. Some embodiments utilize a similar process for user-initiated checking and receiving of updates. For instance, some embodiments provide an option (such as option 1940 shown in FIG. 19) for a user to initiate checking for software updates. Once a user request is received to check for software updates, a process similar to process 400 is performed in order to check for the updates and possibly download them into the client device.

B. Metadata Associated with Security Updates

Some of system software and firmware updates are intended to address security issues and fix different security vulnerabilities in the client device. These updates are different than non-security system software and firmware updates. For instance, a non-security system software update might include new features in the operating system, provide bug fixes in certain device drivers, update dictionaries, provide new camera support, etc.

Some security updates include metadata that provide additional information about the update. The metadata include title, subtitle (or text), a countdown to auto install, an indication whether the update is critical, an indication whether the update requires restart, post install information, etc. In some embodiments all security updates can include this additional metadata. In other embodiments, only critical security updates can include this additional metadata. The following is an example of metadata included for a security update in some embodiments. One of ordinary skill in the art will recognize that the specific keywords and formats used for different elements and keys in the following examples can be changed without deviating from the teachings of the invention.

```
<key>ExtendedMetaInfo</key>
<dict>
    <key>CriticalUpdate</key>
    <true/>
    <key>AutoInstallDelay</key>
    <integer>24</integer>
</dict>
```

In this example, the update is identified as a critical update, which will be installed automatically in 24 hours after the notification is displayed on the device. Some embodiments provide the user or an administrator with the option to disable automatic installation of the updates in which case when the auto install delay for an update expires, the user is notified of the update to be installed immediately without automatically installing the update.

In some embodiments, when there are several critical security updates with different delays waiting to be installed on a device, the smallest delay is used for all pending critical updates. For instance, when the countdown for the update with the smallest delay reaches zero, all pending critical updates are installed regardless of the individual countdowns. These and other criteria for installing security updates are further described in the sections below.

In some embodiments each component package that is part of a critical security update includes additional metadata to identify the content-type as critical. For instance, the following is an example metadata that identifies a package as a part of a critical security update in some embodiments.

<pkg-info content-type="critical-update" format-version="2" identifier= . . .

The CriticalUpdate metadata and/or the content-type metadata is used by the system software update server to limit the scope of the scan for critical updates. Since the critical updates are checked for more often than other updates (e.g., once a day instead of once a week), the metadata that identifies an update as critical updates facilitates the quick identification of these updates and also reduces the amount of download and evaluation of the updates at the client device. The following is another example of metadata for a critical update in some embodiments of the invention.

```
<dict>
    <key>CriticalUpdate</key>
    <true/>
    <key>AutoInstallDelay</key>
    <integer>0</integer>
    <key>NotifyAfter</key>
    <true/>
</dict>
```

In this example, the update is identified as a critical update. Since the AutoInstallDelay is set to zero, the update is installed automatically immediately. Since the NotifyAfter tag is set to true, the user is notified after the update is auto-installed. Some updates include custom strings for notification. Custom strings override default notification strings.

When a security update requires custom notification (either before or after install), the appropriate strings are added to a section of the metadata by using predefined keys. The following is an example of metadata included for an update that is received from security software update server in some embodiments of the invention.

```
<localization>
    <strings language="en"><![CDATA["PRODUCT_TITLE" =
    "Custom Critical Update for OS X";
    "SU_SECURITY_UPDATE_NOTIFY_TITLE" = "Important
    system security update to prevent the WildBootSector virus";
    "SU_SECURITY_UPDATE_NOTIFY_TEXT" = "Please install
    immediately";
    "SU_SECURITY_UPDATE_POST_INSTALL_NOTI-
    FY_TITLE" = "Security update successfully installed";
    "SU_SECURITY_UPDATE_POST_INSTALL_NOTI-
    FY_TEXT" =
    "Your computer is now protected from WildBootSector virus attack";
    ]]></strings>
</localization>
```

In this example, custom notifications for a critical security update are included in a localized string section of the update distribution. The sequence <strings language="en"> sets the default language to English. The term CDATA indicates anything between "<![CDATA[" and "]]>" includes character data rather than markup language.

The SU_SECURITY_UPDATE_NOTIFY_* strings are used by the client device to display the up-front notification prior to the installation of the update and the SU_SECURITY_UPDATE_POST_INSTALL_NOTIFY_* strings are used for the post-install notification (which also require NotifyAfter to be set as shown above).

Some embodiments use a customized string to notify an update when that update is the only critical update waiting to be installed. If there are multiple critical updates, these embodiments use a generic notification regardless of what custom strings do or don't define. In some embodiments custom strings in an update distribution have no effect unless the update is marked as a critical update (e.g., by setting CriticalUpdate to true, as described above). These strings can therefore be speculatively added by an update author in an update distribution in case the update might later be marked as critical prior to distribution to client devices.

C. Notifying the User of Available Updates

Some embodiments, when an update becomes available (e.g., when an automatic update check identifies that one or more system software or application software updates available), display a notification to alert the user of the available update or updates. Some embodiments provide different notifications for an available update. For instance, in some embodiments, a notification (such as a pop up) is displayed on the screen to alert the user of an available update. Some embodiments provide a notification center and display the software update notification in the notification center. Some embodiments provide an update center to display all available security system updates, non-security system updates, and application software updates in the same user interface.

1. Pop UP Notifications

Figure 6:
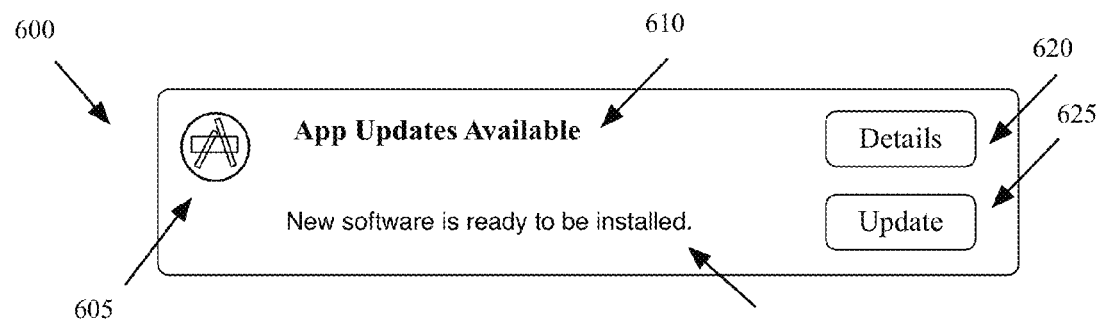
FIG. 6 illustrates an example of a notification that some embodiments display to alert the user of an available application software update.

FIG. 6 illustrates an example of a notification 600 that some embodiments display (e.g., on a corner of the display screen) to alert the user of an available application software update. As shown, an icon 605 identifies the update as an application software update. A generic application notification title 610 and a generic application software update text 615 are also displayed. The user is provided with an option 620 to see the details about the update as well as an option 625 to install the update.

Figure 7:
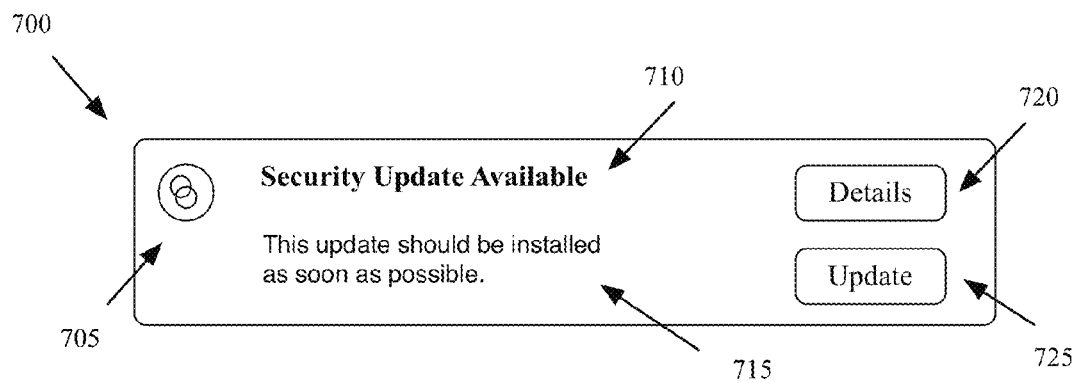
FIG. 7 illustrates an example of a notification that is displayed to alert the user of an available security software update in some embodiments.

FIG. 7 illustrates an example of a notification 700 that is displayed to alert the user of an available security software update in some embodiments. This is an example of a security update that does not include metadata to provide specific details about the update. Therefore, a generic notification is used for the update. As shown, an icon 705 identifies the update as non-critical security software update. A generic security notification title 710 and a generic security software update text 715 are also displayed. The user is also provided with an option 720 to see the details about the update as well as an option 725 to install the update.

Figure 8:
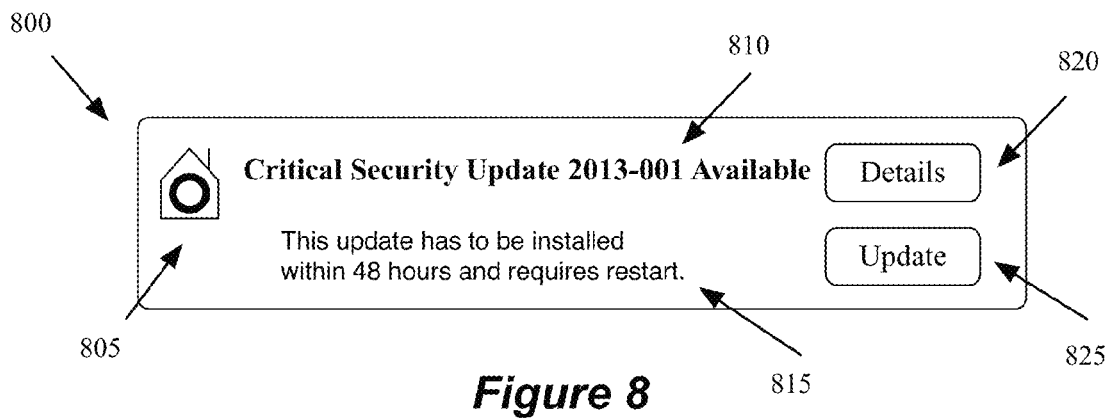
FIG. 8 illustrates an example of a notification that is displayed to alert the user of an available critical security software update in some embodiments.

FIG. 8 illustrates an example of a notification 800 that is displayed to alert the user of an available critical security software update in some embodiments. This is an example of a security update that includes metadata that provide a title and additional description for the update. As shown, an icon 805 that is different than the icon 705 for a non-critical security update identifies the update as a critical application software update. A customized notification title 810 and a customized update text 815 are also displayed. The user is also provided with an option 820 to see the details about the update as well as an option 825 to install the update.

Figure 9:
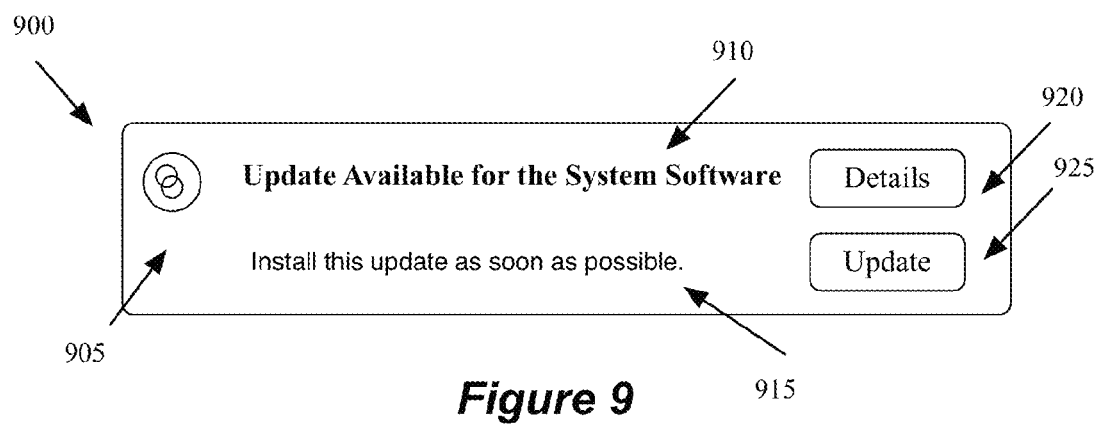
FIG. 9 illustrates an example of a notification that is displayed to alert the user of an available non-security system software update in some embodiments.

FIG. 9 illustrates an example of a notification 900 that is displayed to alert the user of an available non-security system software update (e.g., an upgrade to the operating system) in some embodiments. This is an example of a system software update that is not security related. In this example, an icon 905 that is similar to the icon 705 for a non-critical security update identifies the update. In other embodiments, the icons for the non-critical security updates and regular non-security system software updates are different. A generic notification title 910 and a generic update text 915 are also displayed in this example. The user is also provided with an option 920 to see the details about the update as well as an option 925 to install the update.

In some embodiments, critical update notifications cannot be dismissed and the notification stays on the screen until the critical updates are installed. In other embodiments, the notification is removed from the screen if the user selects to see the details in the software update page (e.g., using the user interface shown in FIG. 19). The notification is displayed either immediately or after a short time out (e.g., after 10 minutes instead of 24 hours for non-critical updates) if the user exists the software update page without installing all critical updates.

2. Notification Center

Figure 10:
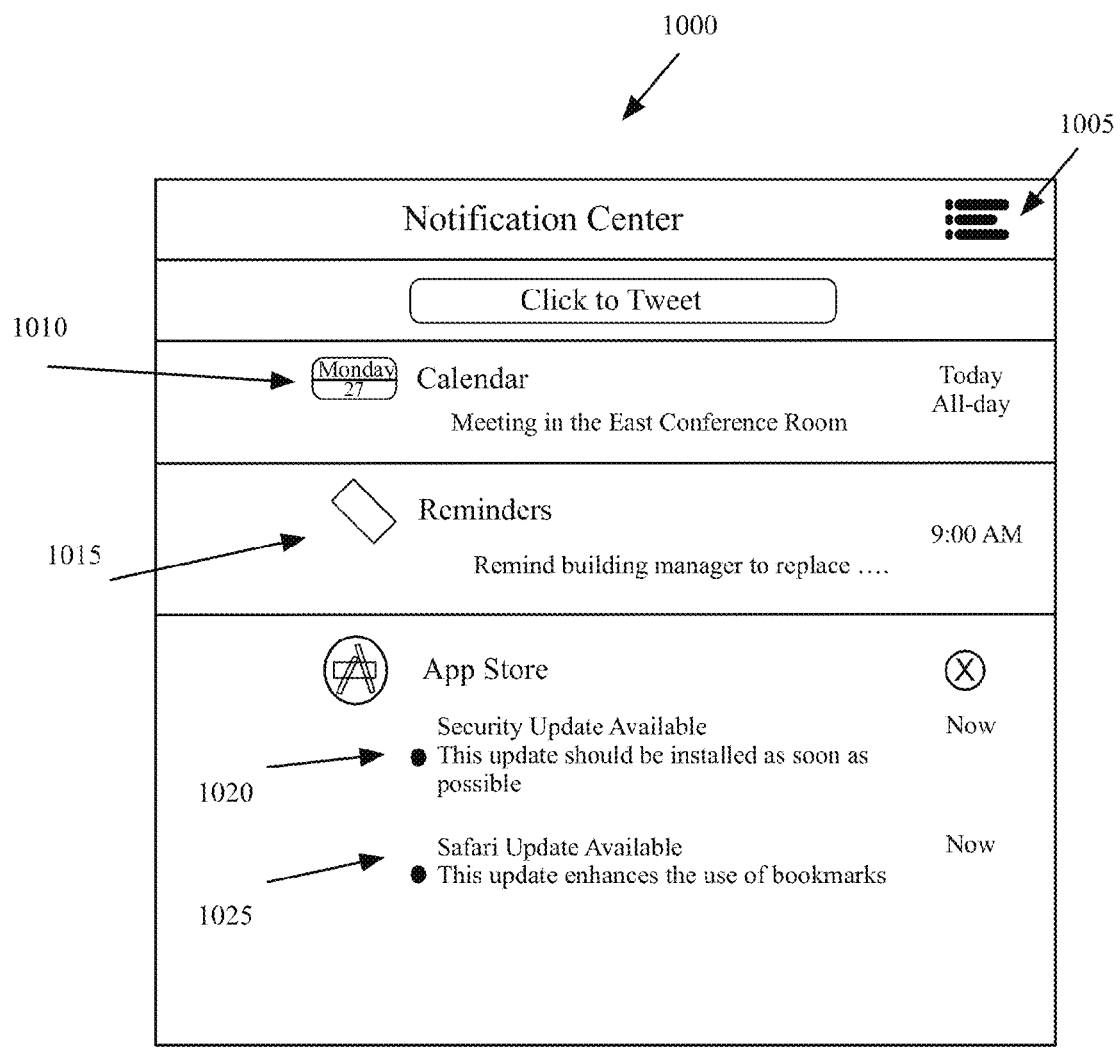
FIG. 10 illustrates an example of a notification center in some embodiments of the invention.

Some embodiments also provide a notification center that is used to display messages and alerts from electronic mail (email), calendar, reminders, games, etc. In some of these embodiments, the notification center is also used to display notifications for third party software, system updates, security updates, and critical security updates. FIG. 10 illustrates an example of a notification center 1000 in some embodiments of the invention. The notification center icon 1005 is displayed on a menu bar or on a corner of the screen when other applications are being executed. The user can access the notification center 1000 from other applications by selecting the notification center icon.

In the example shown, a notification 1010 from the calendar application and a notification 1015 from the reminders application are currently displayed. In addition several notifications 1020-1025 for available updates are shown in the notification center. In the embodiment shown in FIG. 10, notifications for security update 1020 and application update 1025 are displayed in a separate island that other notifications. In some embodiments, each type of software update notification is shown in a separate section in the notification center. In other embodiments, as the illustrated embodiment, all available software update are shown in the same display section.

3. Unified Software Update Center

In some embodiments, a client device includes an application (referred to as App Store or application store) through which a user can purchase (or acquire for free) software applications. In these embodiments, this application coordinates purchase, download, and updates for the application software. In some embodiments, this application also provides a unified update center (such as the update center shown in FIG. 19) for displaying and installing all available updates for the system and application software installed on the device. Providing the unified notification center is described in U.S. patent application Ser. No. 13/841,810, filed Mar. 15, 2013, entitled "Providing A Unified Update Center for Security Software Updates and Application Software Updates,". This concurrently filed U.S. patent application is incorporated herein by reference.

4. Using Metadata to Generate Update Notifications

In some embodiments, application 140 has a set of default notification strings for system software updates. These strings are chosen based on the number of the pending updates and restart requirements. The followings are some examples of the default notification strings.

"CRITICAL_UPDATE_NOTIFICATION_TITLE"= "Security Update Available"

"CRITICAL_UPDATES_NOTIFICATION_TITLE"= "Security Updates Available"

"CRITICAL_UPDATE_NOTIFICATION_TEXT"= "This update should be installed as soon as possible."

"CRITICAL_UPDATES_NOTIFICATION_TEXT"= "These updates should be installed as soon as possible."

"CRITICAL_UPDATE_RESTART_NOTIFICATION_TEXT"="Your computer will restart to complete this update."

"CRITICAL_UPDATES_RESTART_NOTIFICATION_TEXT"="Your computer will restart to complete these updates."

When the metadata SU_SECURITY_UPDATE_NOTIFY_* described above, is received from the update server, the default strings are overridden. In some embodiments, the default strings are overridden if the update is the only critical update waiting. The followings are examples of the default strings used for auto-install updates in some embodiments of the invention, when the countdown has hit zero, "CRITICAL_UPDATE_INSTALL_NOW_TITLE"=" Security Update Required"

"CRITICAL_UPDATES_INSTALL_NOW_TITLE"= "Security Updates Required"

"CRITICAL_UPDATE_INSTALL_NOW_TEXT"= "This update should be installed immediately."

"CRITICAL_UPDATES_INSTALL_NOW_TEXT"= "These updates should be installed immediately."

"CRITICAL_UPDATE_INSTALL_NOW_RESTART_TEXT"="Restart now to complete the installation of this update."

"CRITICAL_UPDATES_INSTALL_NOW_RESTART_TEXT"="Restart now to complete the installation of these updates."

The followings are examples of default notification strings when post-install notifications are enabled, and not overridden by SU_SECURITY_UPDATE_POST_INSTALL_NOTIFY_*.

"CRITICAL_UPDATE_POSTINSTALL_NOTIFICATION_TITLE"="Security Update Installed" "CRITICAL_UPDATES_POSTINSTALL_NOTIFICATION_TITLE"="Security Updates Installed" "CRITICAL_UPDATE_POSTINSTALL_NOTIFICATION_TEXT"="A new security update was installed on your Mac." "CRITICAL_UPDATES_POSTINSTALL_NOTIFICATION_TEXT"="New security updates were installed on your Mac."

Figure 11A:
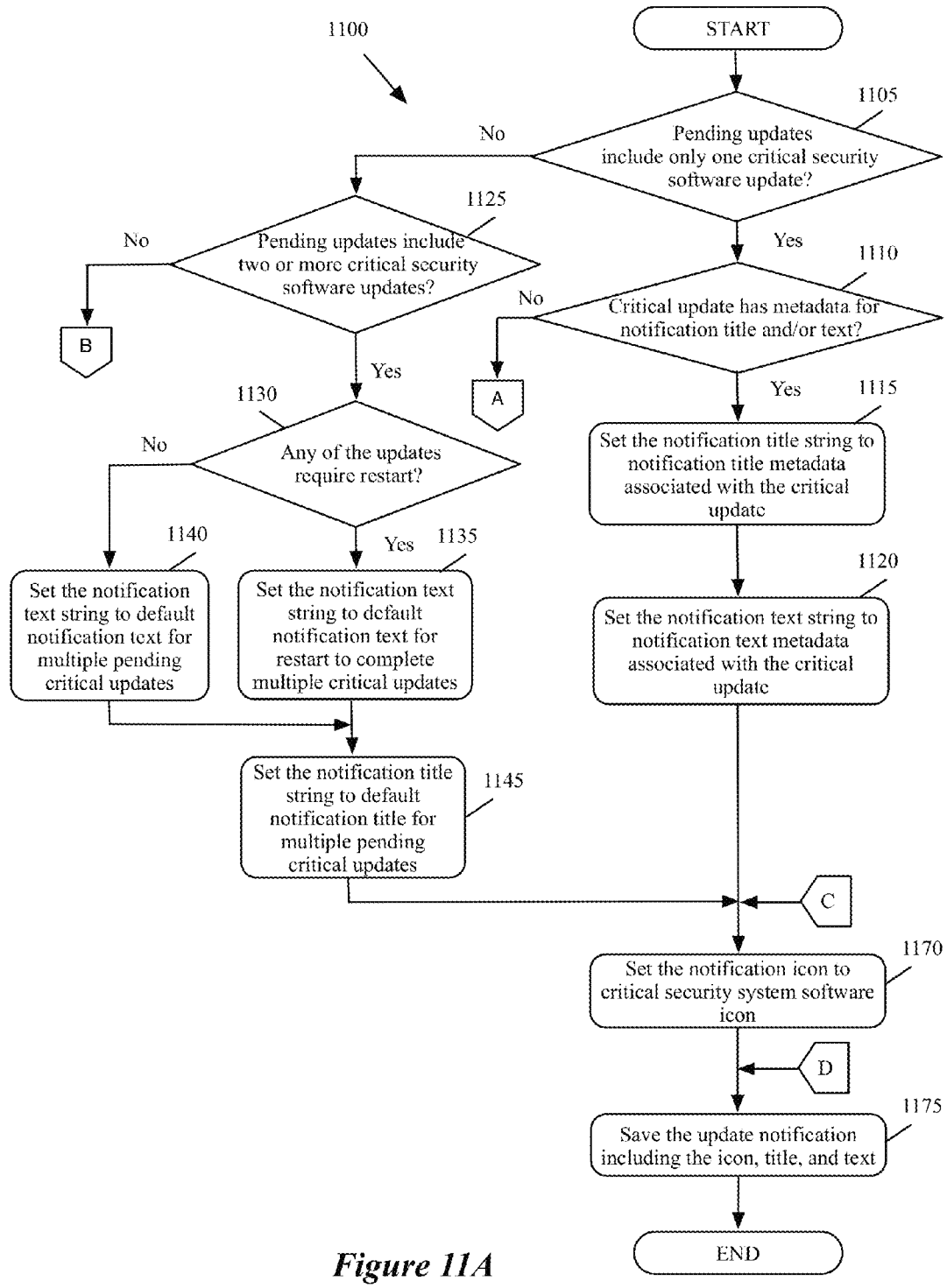
FIGS. 11A-11C conceptually illustrate a process for generating software update notification strings from the metadata associated with the updates in some embodiments of the invention.
Figure 11B:
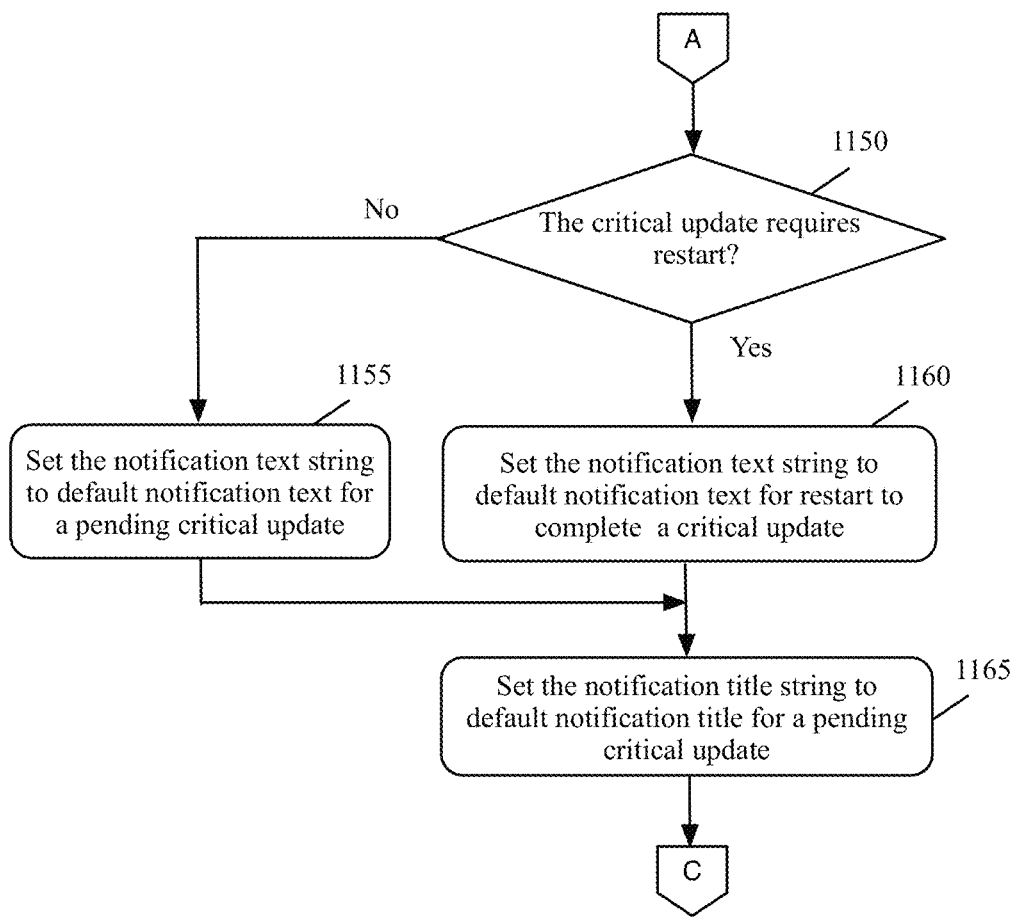
Figure 11C:
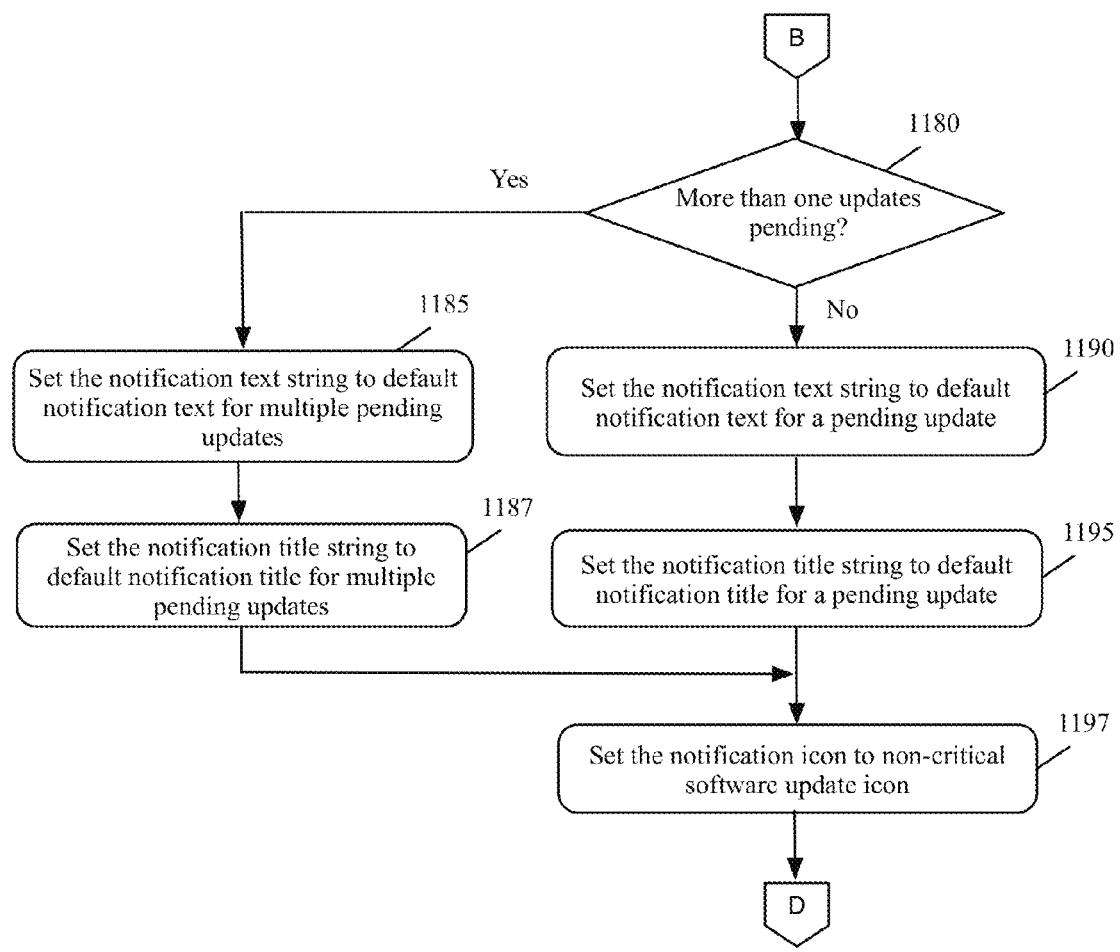

Some embodiments utilize the metadata and other information such as the number of pending updates to generate custom made notifications for different software updates. The notifications. FIGS. 11A-11C conceptually illustrate a process 1100 for generating software update notification strings from the metadata associated with the updates in some embodiments of the invention. The process utilizes the metadata associated with the updates to determine whether an update is a critical update, whether an update requires restart, whether an update has custom notification, etc. The process also determines how many updates are currently pending. The process then selects the proper custom string or default string for the update or updates.

As shown, the process determines (at 1105) whether pending updates include only one critical security software update. If not, the process proceeds to 1125, which is described below. Otherwise, the process determines (at 1110) whether the critical update has metadata for custom notification text and/or custom notification text (or subtitle). For instance the process determines whether the metadata "CRITICAL_UPDATE_INSTALL_NOW_TITLE" or the metadata "CRITICAL_UPDATE_INSTALL_NOW_TEXT" (as described above) exist for the update. If not, the process proceeds to 1150, which is described below.

Otherwise, the process sets (at 1115) the notification title string to notification title metadata associated with the critical update. The process then sets (at 1120) the notification text string to notification text metadata associated with the critical update. The process then proceeds to 1170, which is described below.

The process determines (at 1125) whether the pending updates include two or more critical security software updates. If not (i.e., when there are no security updates pending), the process proceeds to 1180, which is described below. Otherwise, the process determines (at 1130) whether any of the updates require restart. If yes, the process sets (at 1135) the notification text string to default notification text for restart to complete multiple critical updates. The process then proceeds to 1145, which is described below.

Otherwise, the process sets (at 1140) the notification text string to default notification text for multiple pending critical updates. The process then sets (at 1145) the notification title string to default title for multiple pending critical updates. The process then proceeds to 1170, which is described below.

The process determines (at 1150) whether the update requires restart. If yes, the process sets (at 1160) the notification text string to default notification text for restart to complete a critical update. The process then proceeds to 1165, which is described below.

Otherwise, the process sets (at 1155) the notification text string to default notification text for a pending critical update. The process then sets (at 1165) the notification title string to default notification title for a pending critical update. The process then proceeds to 1170, which is described below.

The process determines (at 1180) whether more than one update is pending. If not, the process proceeds to 1190, which is described below. Otherwise, the process sets (at 1185) the notification text string to default notification text for multiple pending updates. The process then sets (at 1187) the notification title string to default notification title for multiple pending updates. The process then proceeds to 1197, which is described below.

The process sets (at 1190) the notification text string to default notification text for a pending update. The process then sets (at 1195) the notification title string to default notification title for a pending update. The process then sets (at 1197) the notification icon to non-critical software update icon (e.g., an icon for application software update or non-critical system software update). The process then proceeds to 1175, which is described below.

The process sets (at 1170) the notification icon to critical security system software icon.

The process then optionally saves (at 1175) the update notification including the icon, title, and text for display by different applications. The process then ends. In some embodiments, process 1100 in addition (or in lieu) of saving the notification, displays the notification to the user.

Figure 12A:
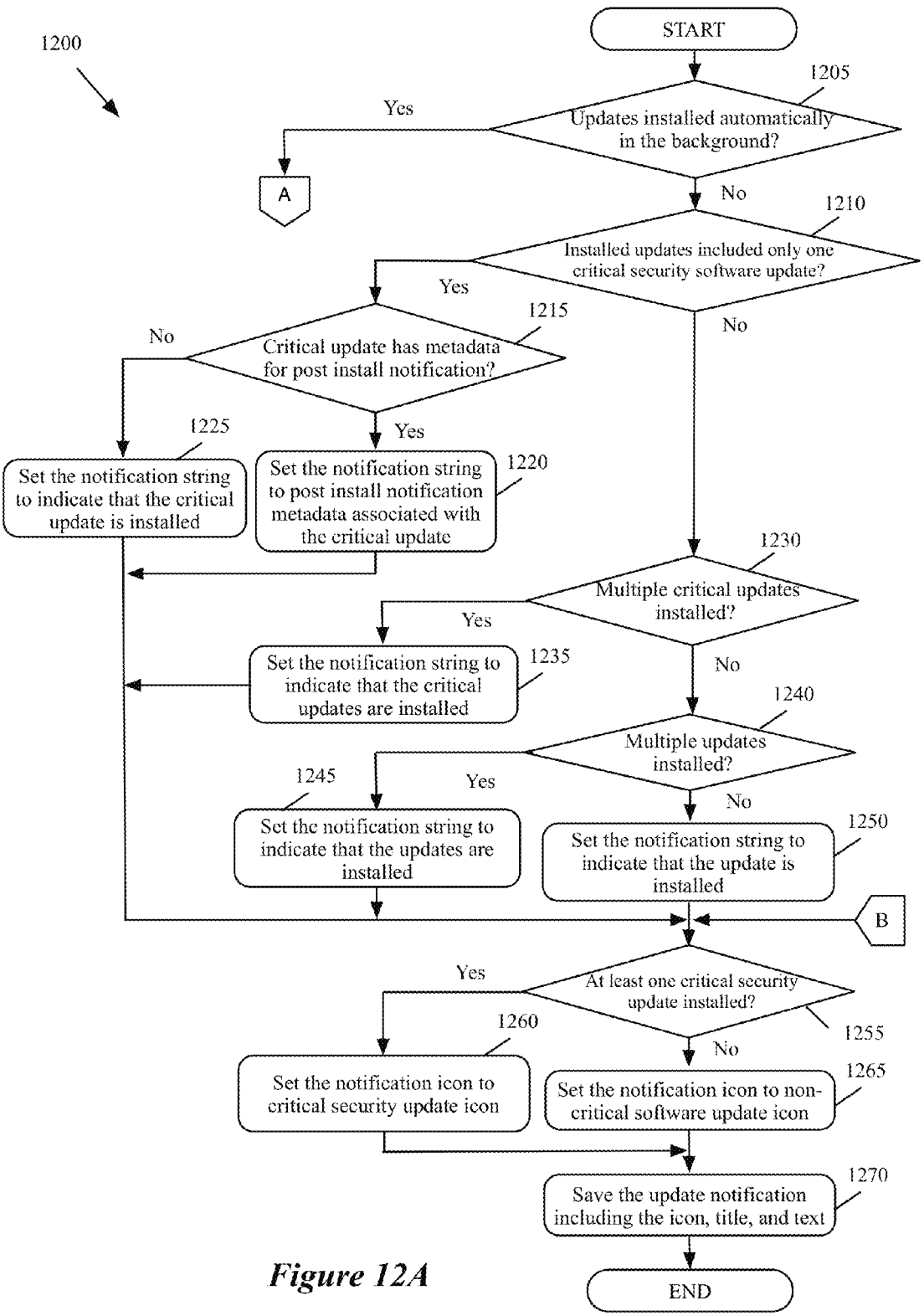
FIGS. 12A-12B conceptually illustrate a process for generating post installation software update notification strings from the metadata associated with the updates in some embodiments of the invention.
Figure 12B:
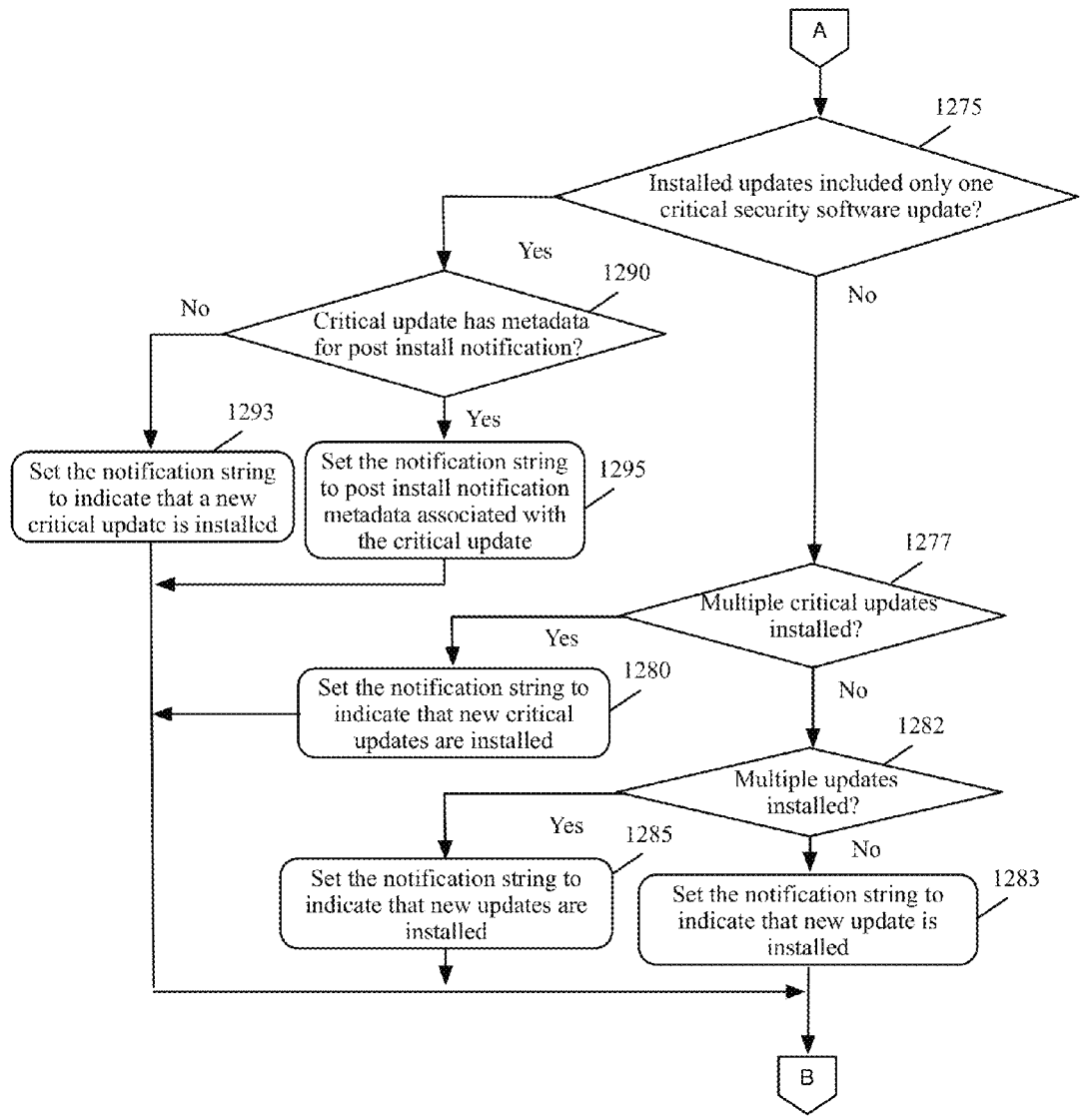

FIGS. 12A-12B conceptually illustrate a process 1200 for generating post installation software update notification strings from the metadata associated with the updates in some embodiments of the invention. The process utilizes the metadata associated with the updates to determine whether an installed update is a critical update, whether an update required restart, whether an update has custom notification, etc. The process also determines how many updates were installed. The process then selects the proper custom post install notification string or default post install notification string for the update or updates.

As shown, the process determines (at 1205) whether the updates were installed automatically in the background. If yes, the process proceeds to 1275, which is described below. Otherwise, the process determines (at 1210) whether the installed updates include only one critical security software update. If not, the process proceeds to 1230, which is described below. Otherwise, the process determines (at 1215) whether the critical update has metadata for post install notification. For instance the process determines whether the metadata "SU_SECURITY_UPDATE_POST_INSTALL_NOTIFY_TITLE" or the metadata "SU_SECURITY_UPDATE_POST_INSTALL_NOTIFY_TEXT" (as described above) exist for the update. If yes, the process sets (at 1220) the notification string to post install notification metadata associated with the critical update. The process then proceeds to 1255, which is described below. Otherwise, the process sets (at 1225) the notification string to indicate that the critical update is installed. The process then proceeds to 1255, which is described below.

The process determines (at 1230) whether multiple critical updates are installed. If yes, the process sets (at 1235) the notification string to indicate that the critical updates are installed. The process then proceeds to 1255, which is described below. Otherwise, the process determines (at 1240) whether multiple updates (i.e., multiple non-critical updates) are installed. If yes, the process sets (at 1245) the notification string to indicate that updates are installed. The process then proceeds to 1255, which is described below. Otherwise, the process sets (at 1250) the notification string to indicate that the update is installed.

When updates were automatically installed in the background, the process determines (at 1275) whether the installed updates included only one critical security software update. If not, the process proceeds to 1277, which is described below. Otherwise, the process determines (at 1290) whether the critical update has metadata for post install notification (as described above for operation 1215. If yes, the process sets (at 1295) the notification string to post install notification metadata associated with the critical update. The process then proceeds to 1255, which is described below. Otherwise, the process sets (at 1293) the notification string to indicate that a new critical update is installed. The process then proceeds to 1255, which is described below.

The process determines (at 1277) whether multiple critical updates are installed. If yes, the process sets (at 1280) the notification string to indicate that new critical updates are installed. The process then proceeds to 1255, which is described below. Otherwise, the process determines (at 1282) whether multiple updates (i.e., multiple non-critical updates) are installed. If yes, the process sets (at 1285) the notification string to indicate that new updates are installed. The process then proceeds to 1255, which is described below. Otherwise, the process sets (at 1283) the notification string to indicate that a new update is installed.

The process then determines (at 1255) whether at least one critical security update is installed. If yes, the process sets (at 1260) the icon for the notification to critical security update icon. The process then proceeds to 1270, which is described below. Otherwise, the process sets (at 1265) the icon for notification to for the icon for non-critical security updates (e.g., an icon for application software update or non-critical system software update). The process then optionally saves (at 1270) the update notification including the icon, title, and text for display by different applications. The process then ends. In some embodiments, process 1200 in addition (or in lieu) of saving the notification, displays the notification to the user.

D. Installing the Available Security Updates

Some embodiments provide several mechanisms for automatic and user initiated installation of security updates. In some embodiments, a subset of security updates is identified as critical security updates. In other embodiments, all security updates are treated as critical updates. In all these embodiments, the critical security updates (being all security updates or a subset that is identified as critical updates) are treated with more urgency than other updates.

As described above, security updates include additional associated metadata that facilitate the urgent treatment of these updates. The list of available software updates that the client device receives from the system software update server includes metadata that are associated with an update either when the update author created a distribution package for the update or was later added to the package at the update server. For instance, the update author can add metadata to identify the update as a critical security update. Alternatively, the update server in some embodiments adds metadata to the package to identify the update as a critical update when the update becomes critical subsequent to distribution by the author. In addition, some critical security updates include metadata to indicate whether an update has to be installed immediately or has a delay to install. The updates can also be installed manually by user commands.

1. Automatic Installation of Security Updates

Figure 13:
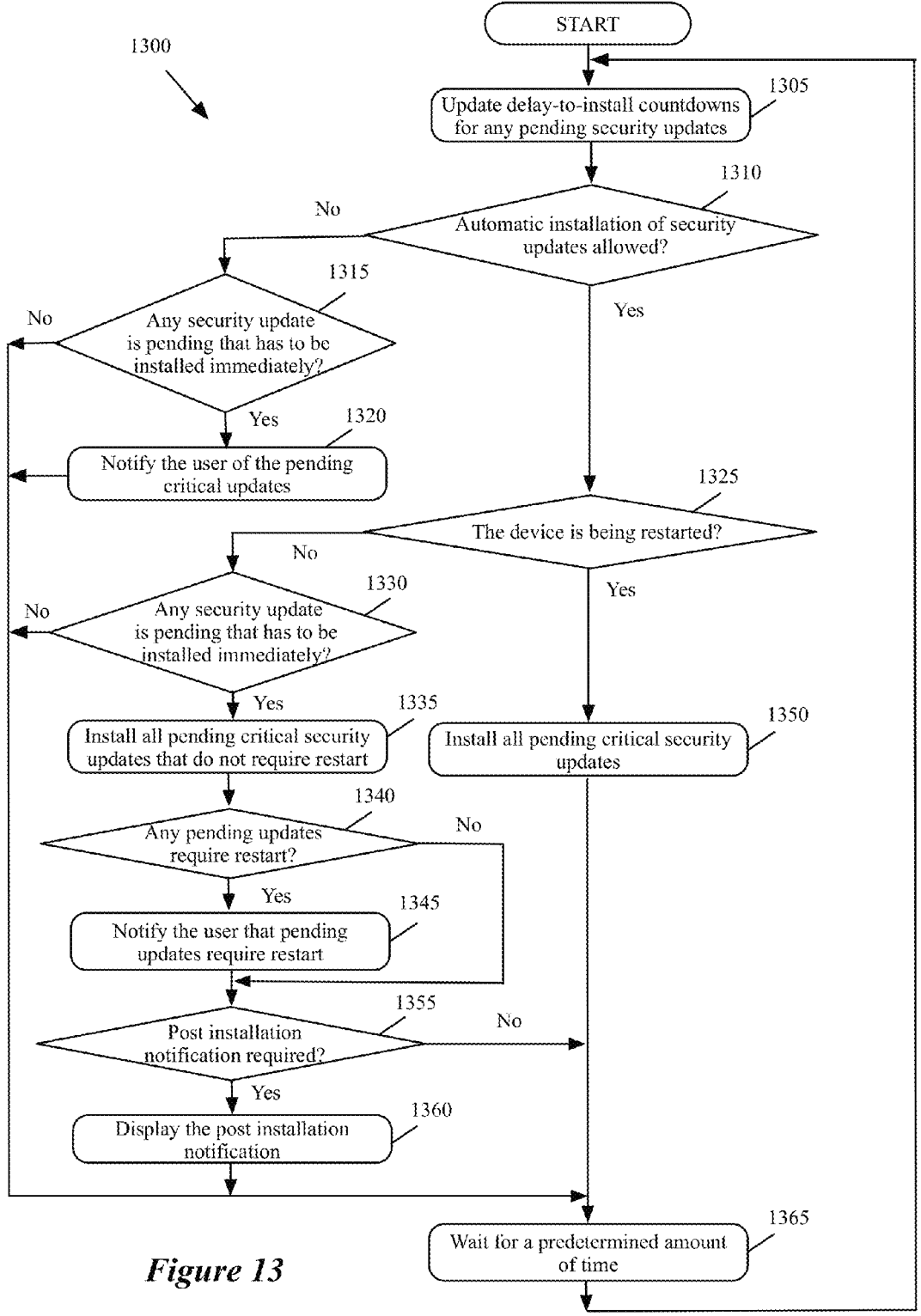
FIG. 13 conceptually illustrates a process for automatically installing security updates in some embodiments of the invention.

FIG. 13 conceptually illustrates a process 1300 for automatically installing security updates in some embodiments of the invention. As shown, the process updates (at 1305) the delay-to-install counters for the pending security updates (if any). A security update can be associated with a countdown or "delay-to-install counter" (e.g., the AutoInstallDelay metadata described above) that identifies how much the installation of the update can be delayed after the availability of the security update is first announced on the device. The delay to install the update is specified in a predetermined unit of time (e.g., hours). A security update can also have associated metadata to identify the update as an update to immediately install (e.g., by setting the countdown to zero). A security update can also have no specific countdown.

Process 1300 in some embodiments is periodically activated (e.g., after the predetermined amount of time described in 1365 below has elapsed) and updates any countdowns by the predetermined amount of time until the countdowns reach zero. The process then determines (at 1310) whether automatic updates are allowed. Some embodiments provide the user or a system administrator with an option to allow automatic installation of security updates. As in the example shown in FIG. 5, option 515 allows automatic installation of all security updates. Other embodiments provide an option to allow automatic installation of critical security updates but not non-critical security update. In the example of FIG. 5, the same option 515 also authorizes automatic installation of system data files such as updates to dictionaries, etc. Other embodiments provide a separate option (or no option) to allow automatic installation of system data files.

Referring back to FIG. 13, when automatic updates are allowed, the process proceeds to 1325, which is described below. Otherwise, the process determines (at 1315) whether any security update is pending that has to be installed immediately. Process 1300 makes this determination when the countdown for any pending security updates is zero, i.e., either the countdown was originally set to zero when the update was received from the update server or the update had a countdown that has been subsequently expired.

Figure 14:
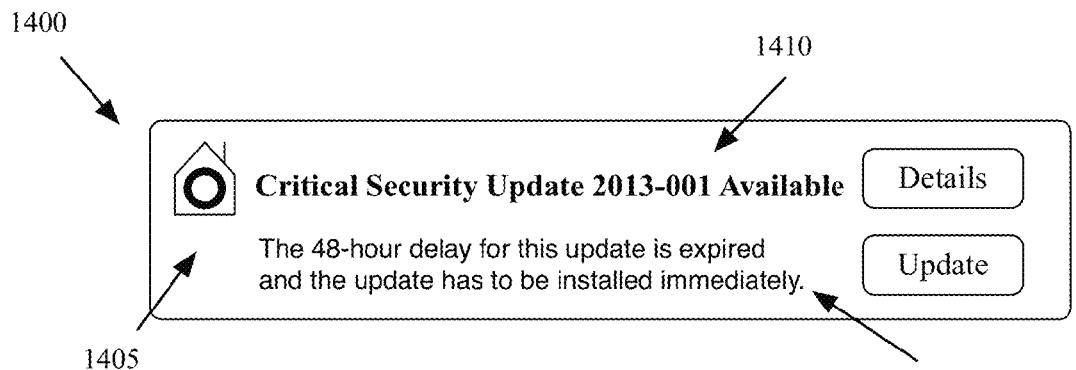
FIG. 14 illustrates an example of a customized message displayed for a critical update with an expired delay in some embodiments of the invention.

When there is no security update that has to be installed immediately, process 1300 proceeds to 1365, which is described below. Otherwise, the process notifies (at 1320) the user of the pending critical updates that require immediate installation. The process then proceeds to 1365, which is described below. The process in some embodiments displays (at 1320) a message on the device display screen and/or sounds an alert to get the user's attention. Some embodiments use a customized string to notify an update. FIG. 14 illustrates an example of a customized message 1400 displayed for a critical update with an expired delay in some embodiments of the invention. As shown, the message title 1410 identifies the specific critical update. The message icon 1405 identifies the update as a critical update and the customized text 1415 of the message states that the countdown to install the update has reached the zero and the user has to install the update immediately. In some embodiments, such an urgent message either cannot be dismissed by the user or is displayed with a much faster frequency than notification for non-critical updates (e.g., once every 10 minutes instead of once a day). In some embodiments custom strings in an update distribution have no effect unless the update is marked as a critical update (e.g., by setting CriticalUpdate to true, as described above).

Figure 15:
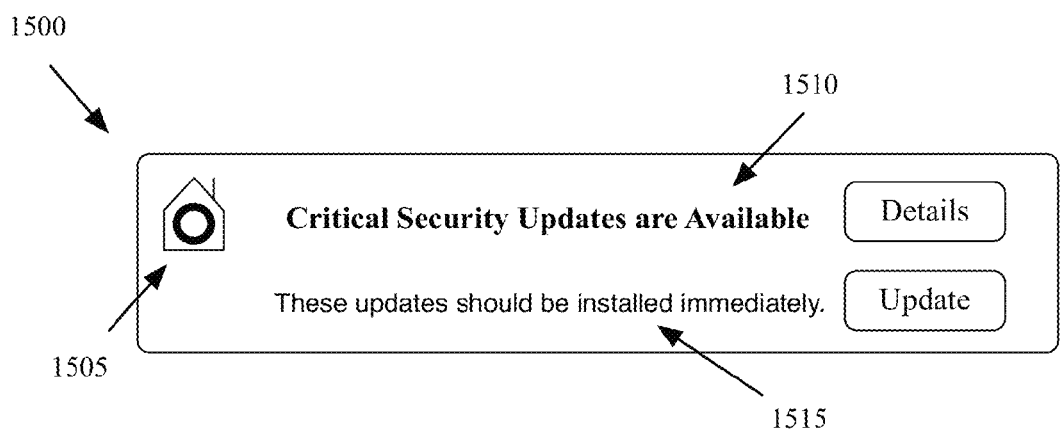
FIG. 15 illustrates an example of a generic message displayed when several security updates are pending that have to be installed in some embodiments of the invention.

In some embodiments, a customized string is used only when that update is the only critical update waiting to be installed. If there are multiple critical updates, these embodiments use a generic notification regardless of what custom strings do or don't define. FIG. 15 illustrates an example of a generic message 1500 displayed when several security updates are pending that have to be installed in some embodiments of the invention. As shown, the message title 1510 identifies that several critical security updates are available. The message icon 1505 identifies the updates as critical updates and the generic text 1515 of the message states that these updates should be installed immediately.

Referring back to FIG. 13, the process determines (at 1325) whether the device is currently being restarted (i.e., the process is activated during a restart). If not, the process proceeds to 1330, which is described below. Otherwise, the process installs (at 1350) all pending security updates or all pending critical security updates. As described above by reference to option 515 in FIG. 5, some embodiments provide the user or system administrator with the option to enable automatic install of all security updates while other embodiments provide the option to enable automatic install of all critical security updates. The process then proceeds to 1365, which is described below.

When the device is not being restarted, the process determines (at 1330) whether any security updates is pending that has to be installed immediately. Process 1300 makes this determination when the countdown for any pending security updates is zero, i.e., either the countdown was originally set to zero when the update was received from the update server or the update had a countdown that has been subsequently expired.

Figure 16:
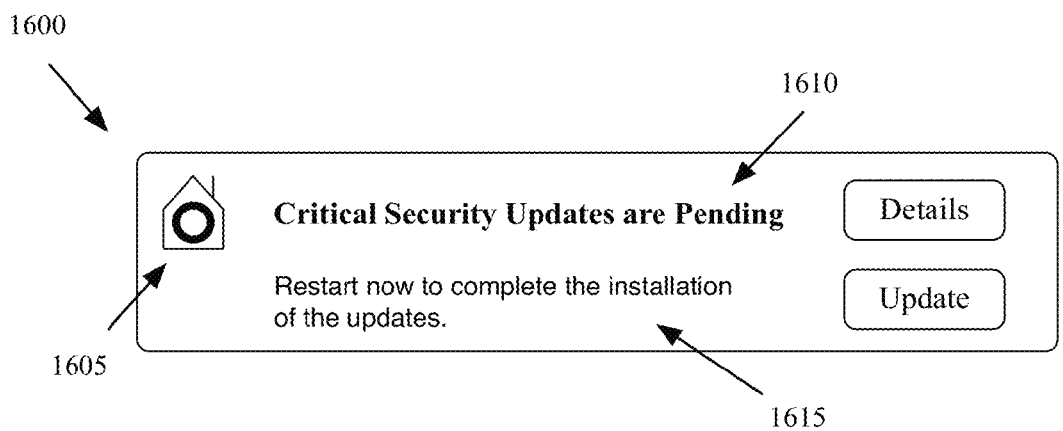
FIG. 16 illustrates an example of a generic message displayed when several security updates that require restart are pending that have to be installed in some embodiments of the invention.

When there is no security update that has to be installed immediately, process 1300 proceeds to 1365, which is described below. Otherwise, the process installs (at 1335) all pending security updates (or all critical security updates, depending on the specific preference settings) that do not require restart. The updates that require restart are either not installed or installed and proceed up to a point that the restart is required. The process then determines (at 1340) whether any pending updates remain that requires restart. If not, the process proceeds to 1355, which is described below. Otherwise, the process notifies (at 1345) the user of any pending critical updates that have not been installed. FIG. 16 illustrates an example of a generic message 1600 displayed when several security updates that require restart are pending that have to be installed in some embodiments of the invention. As shown, the message title 1610 identifies that several critical security updates are available The message icon 1605 identifies the updates as critical updates and the generic text 1615 of the message asks the user to restart the device now to complete the installation of the update.

Figure 17:
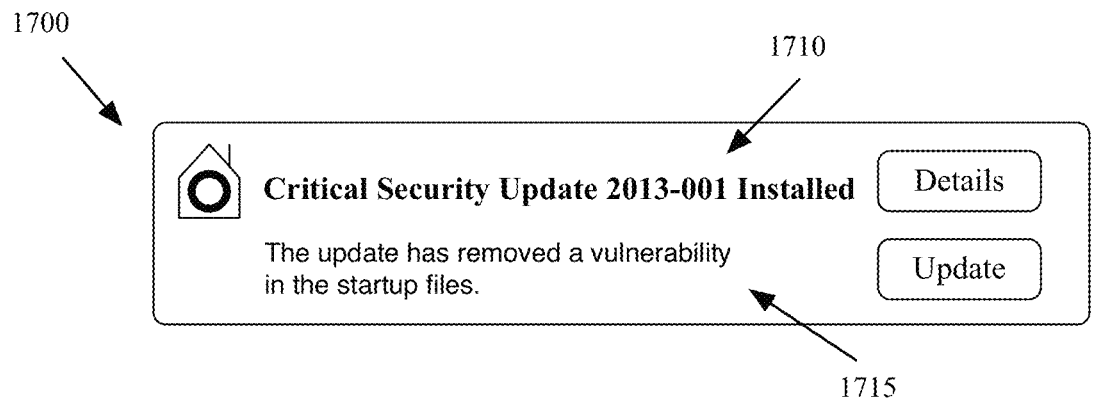
FIG. 17 illustrates an example of a customized message displayed after the installation of a critical update in some embodiments of the invention.

Process 1300 then determines (at 1355) whether post installation notification is required. If not, the process proceeds to 1365, which is described below. Otherwise, the process displays (at 1360) the post installation notification. Some embodiments use a customized post installation strings to notify that an update is installed. FIG. 17 illustrates an example of a customized message 1700 displayed after the installation of a critical update in some embodiments of the invention. As shown, the message title 1710 identifies the specific critical update. The customized text 1715 of the message states that the update has removed a vulnerability in the startup files. In some embodiments custom strings in an update distribution have no effect unless the update is marked as a critical update (e.g., by setting CriticalUpdate to true, as described above).

Figure 18:
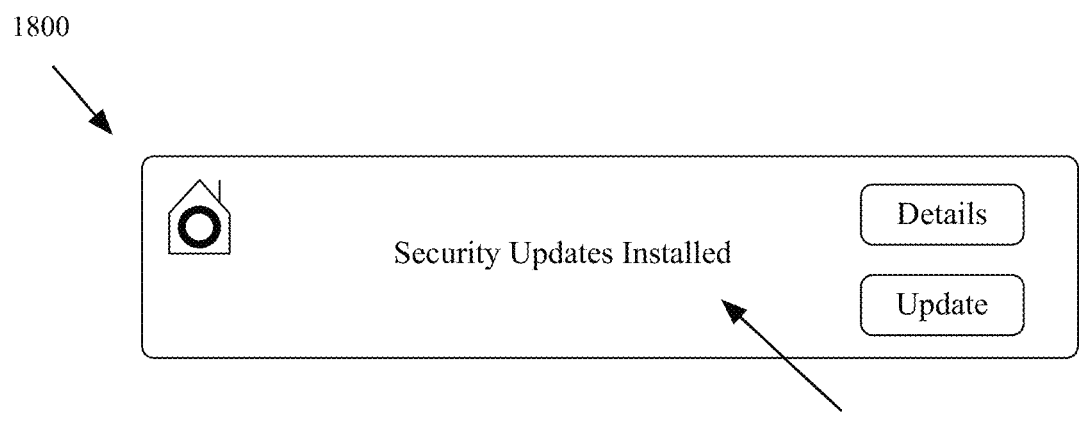
FIG. 18 illustrates an example of a generic message displayed when several security updates are installed in some embodiments of the invention.

In some embodiments, a customized string is used when the installed update is the only critical update that has been currently installed. If multiple critical updates are installed or a single update without customized strings is installed, these embodiments use a generic notification regardless of what custom strings do or don't define. FIG. 18 illustrates an example of a generic message 1800 displayed when several security updates are installed in some embodiments of the invention. As shown, the text 1815 of the message states that the security updates are installed. A process for generating the post install notifications was described by reference to FIGS. 11A-11C, above.

Referring back to FIG. 13, process 1300 waits (at 1365) a predetermined amount of time and then proceeds back to 1305, which was described above. In some embodiments, the predetermined time is the actual elapsed time. Therefore, if the device is turned off or is in hibernation for a period of time, that period of time is considered in determining the wait time. For instance, consider the example when the wait period is one day. If the device is kept on for two hours after process 1300 reaches operation 1360, is turned off for 18 hours, and is turned on again, then he process performs operation 1305 four hours after it is turned on again. The predetermined wait time in some embodiments depends on what type of updates is pending. For instance, when any critical update is pending, the wait time is set to a first period of time (e.g., 10 minutes) and when no critical updates are pending, the wait time is set to 1 day.

2. Manual Installation of Security Updates

In addition to automatic installation of security updates, the user is provided with different options to manually install all or a selected number of the pending security updates. For instance, the user can select the update button in any of FIGS. 7-8 and 14-18 to install the security update or updates that are announced.

Figure 19:
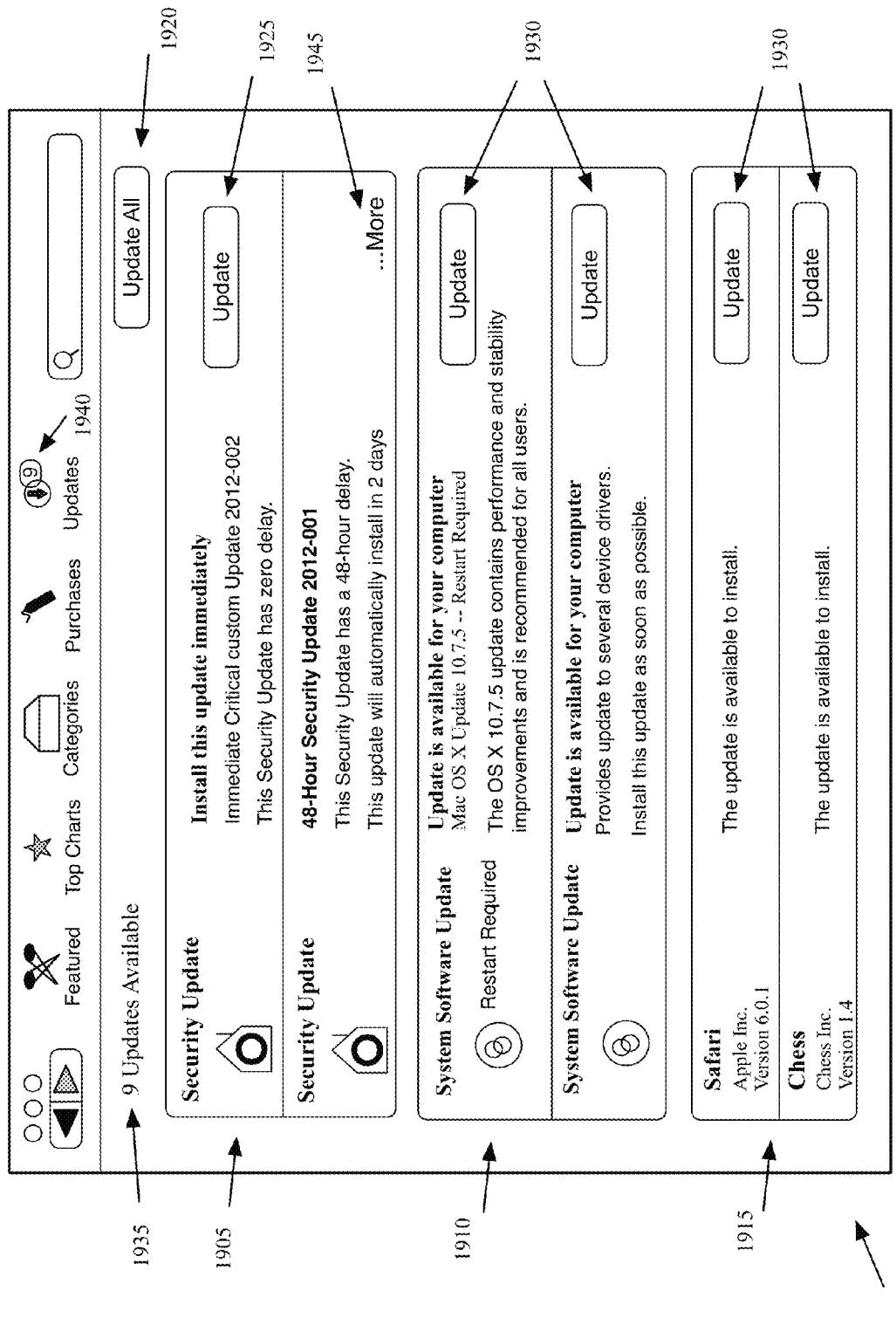
FIG. 19 illustrates an example of a user interface manages updates received from different sources in some embodiments of the invention.

In addition, the user is provided with different options in the unified software update user interface to install one or more security updates. FIG. 19 illustrates an example of a user interface 1900 that manages updates received from different sources in some embodiments of the invention.

In this example, a total of nine updates are available (as shown by 1935 and 1940). Two updates are shown in each category of security system software updates 1905, non-security system software updates 1910, and application software updates 1915. In addition, several more security updates are available that can be viewed by selecting the option 1945. As shown in the figure, all pending update regardless of the category can be installed at once by selecting the update all button 1920.

In addition, updates in non-security system software update section 1910 and application software update section 1915 can be individually installed by selecting each update button 1930. In the illustrated embodiments, the updates in the security updates section 1905 cannot be individually installed. Instead, all pending security updates (including the updates that are viewable by selecting option 1945) are installed when the user selects the update button 1925. In other embodiments (not shown), the security updates are also individually selectable.

II. Software Architecture

Figure 20:
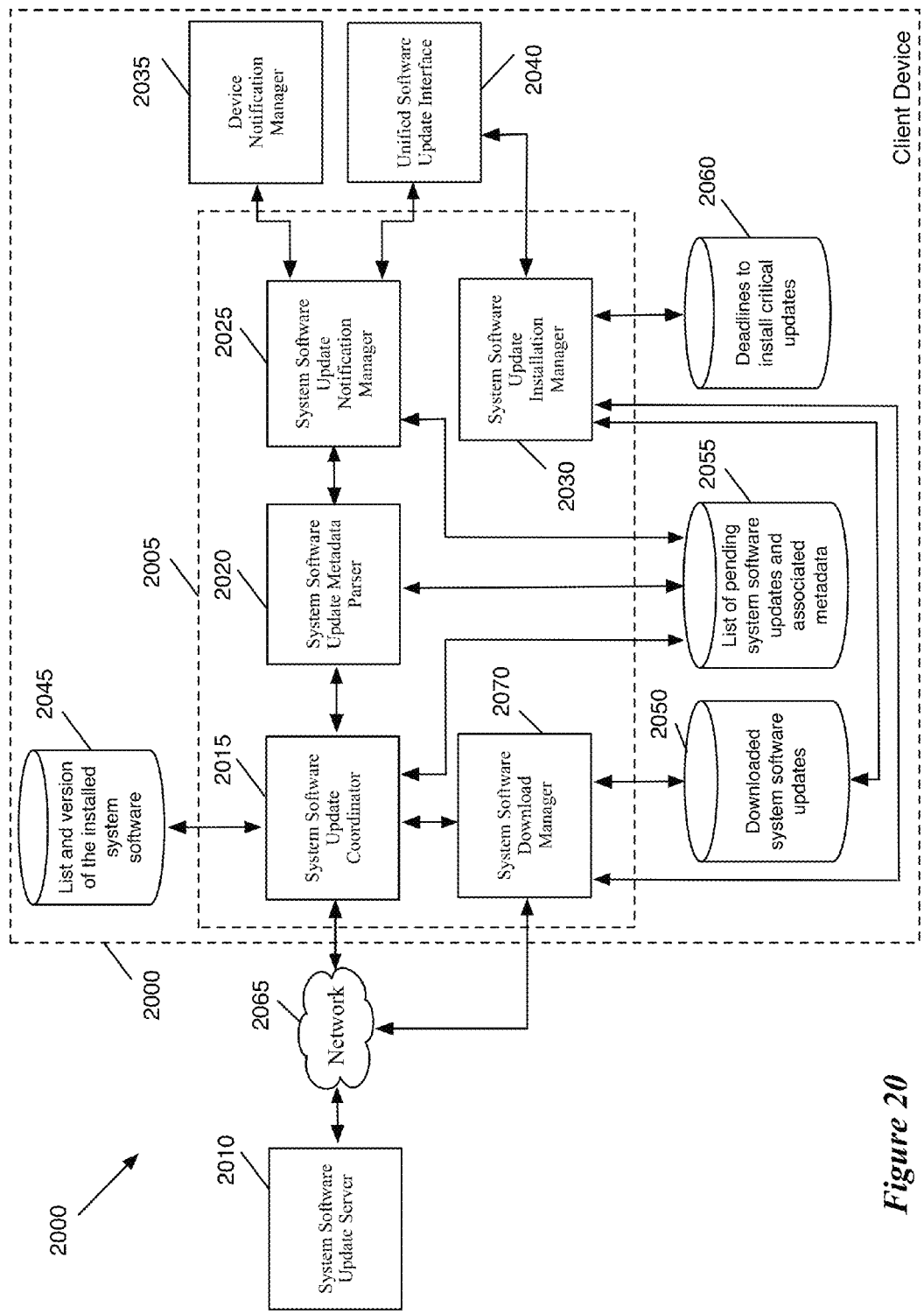
FIG. 20 conceptually illustrates the software architecture for system software update in some embodiments of the invention.
Figure 21:
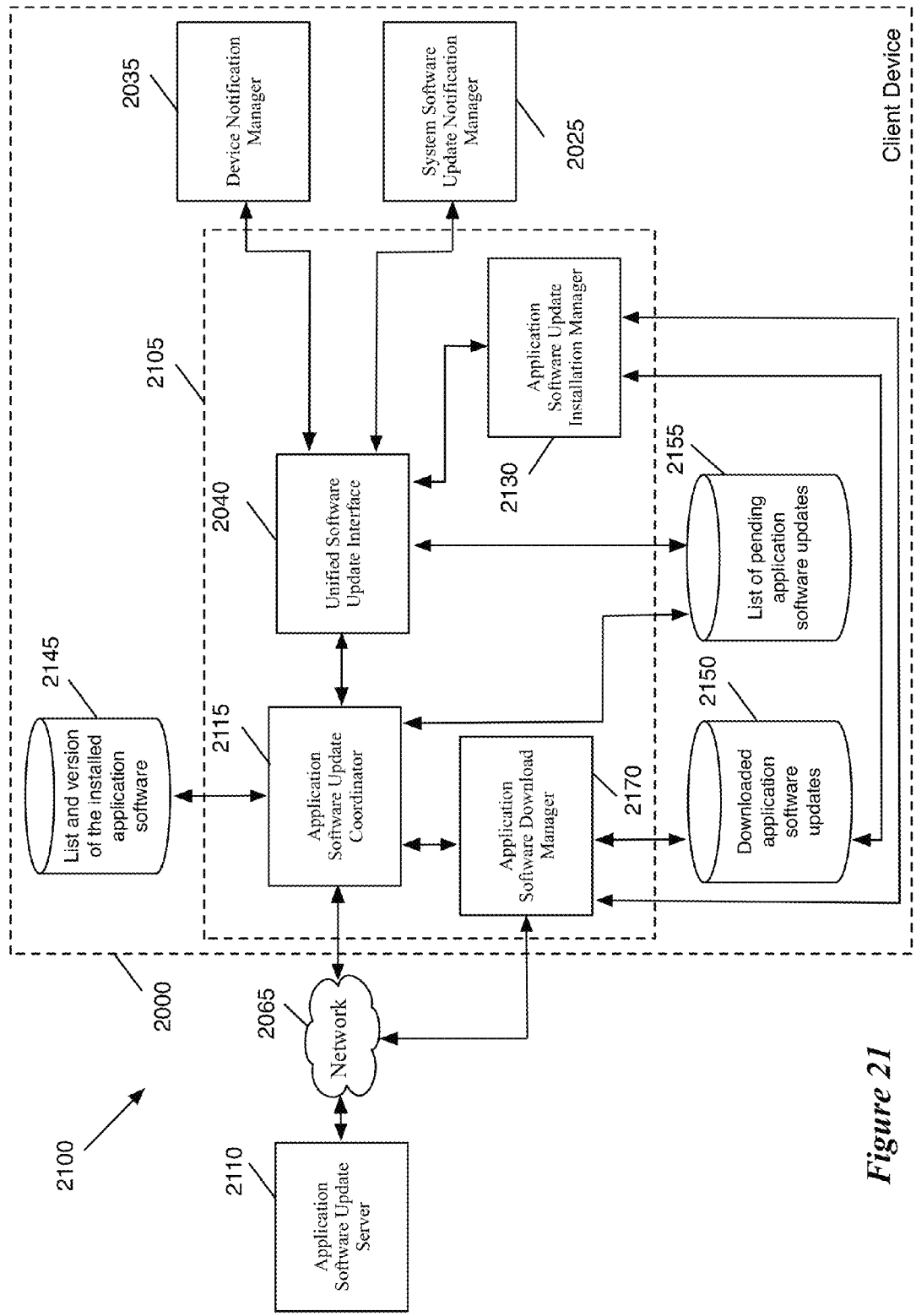
FIG. 21 conceptually illustrates the software architecture for a unified software update center in some embodiments of the invention.

In some embodiments, the processes described above are implemented as software running on a particular machine, such as a computer, a media player, a touchpad, a cell phone, etc. FIGS. 20 and 21 conceptually illustrate the software architecture of different components for managing, displaying, and installing software updates in some embodiments.

FIG. 20 conceptually illustrates the software architecture for system software update of a device 2000 in some embodiments of the invention. The system software update components 2005 include a System Software Update Coordinator module 2015, a System Software Update Metadata Parser module 2020, a System Software Update Notification Manager 2025, a System Software Download Manager module 2070, and a System Software Update Installation module 2030.

System Software Update Coordinator module 2015 sends requests to the System Software Update Server 2010 through a network 2065 such as the Internet for a list of the available system software updates. System Software Update Coordinator module 2015 in some embodiments contacts System Software Update Server 2020 after receiving a user command. In addition, System Software Update Coordinator module 2015 contacts the server automatically with different frequencies to receive critical security updates and other system software updates.

Software Update Coordinator module 2015 receives the list of available system software updates from System Software Update Server. Software Update Coordinator module 2015 determines the updates that are applicable to the client device and adds them to the list of pending system software updates and associated metadata 2055 stored in the client device. When automatic software downloading is enabled on the device, System Software Update Coordinator module 2015 coordinates with to System Software Download Manager 2070 to download the applicable system software updates and save them in storage 2050. Software Update Coordinator module 2015 also coordinates with System Software Update Metadata Parser module 2020 to parse the list of pending system software updates and associated metadata 2055 and provide the extracted metadata to other system Software Update Notification Manager module 2030.

Software Update Notification Manager module 2025 uses the list of pending system software updates and the associated metadata and displays (e.g., as pop ups) notifications for the pending critical security system software updates (e.g., as shown in FIGS. 8 and 14-16), non-critical security system software updates (e.g., as shown in FIG. 7), and non-security system software updates (e.g., as shown in FIG. 9) and display them in the notification user interface.

In addition, Software Update Notification Manager module 2025 provides data to Device Notification Manager module 2035 and Unified Software Update Interface module 2040. Device Notification Manager module 2035 receives notifications, messages, and alerts from different applications and modules (such as email, calendar, reminders, games, etc.) on the device and displays them in a notification user interface such as the user interface shown in FIG. 10. As described by reference to FIG. 21 below, Unified Software Update Interface module 2040 receives data from Software Update Notification Manager module 2025 for the content displayed in sections of software update page that are dedicated to system software updates (e.g., the content for sections 1905 and 1910 in FIG. 19).

System Software Update Installation Manager module 2030 receives user-initiated requests (e.g., through user interfaces provided by the Device Notification Manager module 2035, Unified Software Update Interface 2040, or different pop up notifications) to install one or more pending updates. In addition, System Software Update Installation Manager module 2030 checks updates preferences set for the device and checks the countdowns to install critical updates. Once System Software Update Installation Manager module 2030 determines that one or more updates can be installed (either automatically or based on user commands), the module retrieves the downloaded system software updates 2050 and installs them on the device. If the required updates are not downloaded in the background, System Software Update Installation Manager module 2030 requests System Software Download Manager module 2070 to download the requested updates from the System Software Update Server 2010.

FIG. 21 conceptually illustrates the software architecture for a unified software update center for a device 2000 in some embodiments of the invention. The unified software update center in some embodiments is part of a larger application such as the App Store described in the above incorporated U.S. patent application Ser. No. 13/841,810, filed Mar. 15, 2013, entitled "Providing A Unified Update Center for Security Software Updates and Application Software Updates,". For simplicity, only the components 2105 related to software updates are shown in FIG. 21. As shown, these components include Application Software Update Coordinator module 2115, Unified Software Update Interface module 2040, Application Software Update Installation Manager module 2130, and Application Software Download Manager module 2170.

Application Software Update Coordinator module 2115 sends requests to the Application Software Update Server 2110 through a network 2065 such as the Internet for a list of the available application software updates. Application Software Update Coordinator module 2115 in some embodiments contacts System Software Update Server 2120 either after receiving a user command or periodically to receive application software updates for the device 2000.

Application Update Coordinator module 2115 receives the list of available system software updates from Application Software Update Server. Application Update Coordinator module 2115 determines the updates that are applicable to the client device and adds them to the list of pending application software updates 2155 stored in the client device. When automatic downloading for application software updates is enabled on the device, Application Software Update Coordinator module 2115 coordinates with to Application Software Download Manager 2170 to download the available application software updates and save them in storage 2150.

In some embodiments, Application Software Update Server 2110 renders one or more display pages (e.g., in a browser compatible language such as HTML) and sends them to Application Software Update Coordinator module 2115, which in turn passes the pages to Unified Software Update Interface module 2040. Examples of pages displayed by the Unified Software Update Interface module 2040 were described by reference to FIG. 19, above. The pages received from the Application Software Update Server 2110 include frames and the titles of different sections, the menu bar, as well as the contents for the application software update section (e.g., section 1915 in FIG. 19).

In addition, Unified Software Update Interface module 2040 receives data to display as the content for the sections that are dedicated to system software updates (e.g., sections 1905 and 1910 in FIG. 19). This data is received from System Software Update Notification Manager 2025 based on the available critical security updates, non-critical security updates, and other system software updates.

Unified Software Update Interface module 2040 receives also uses the list of pending application software updates 2155 and displays (e.g., as pop ups) notifications for the pending application software updates (e.g., as shown in FIG. 6). In addition, Unified Software Update Interface module 2040 provides notifications for application software updates to Device Notification Manager module 2035, which displays them in a notification user interface such as the user interface shown in FIG. 10.

Application Software Update Installation Manager module 2130 receives user-initiated requests (e.g., through user interfaces provided by the Device Notification Manager module 2035, Unified Software Update Interface 2040, or different pop up notifications) to install one or more pending updates. In addition, Application Software Update Installation Manager module 2130 checks updates preferences set for the device to determine whether any application software updates can be automatically installed. Once Application Software Update Installation Manager module 2130 determines that one or more updates can be installed (either automatically or based on user commands), the module retrieves the downloaded application software updates 2150 and installs them on the device. If the required updates are not downloaded in the background, Application Software Update Installation Manager module 2130 requests Application Software Download Manager module 2170 to download the requested updates from the Application Software Update Server 2110.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 22:
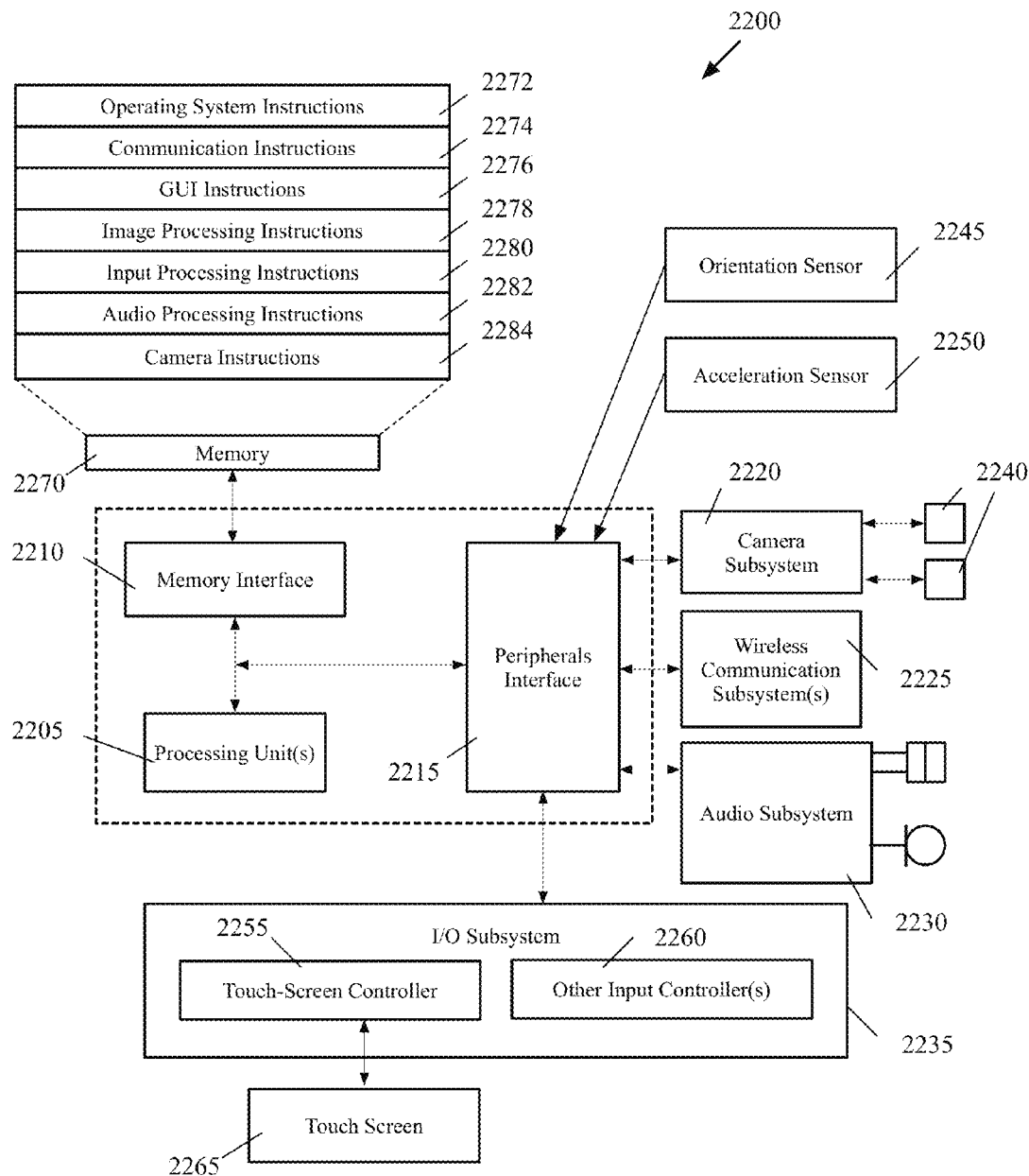
FIG. 22 is an example of an architecture of a mobile computing device in some embodiments of the invention.

Several applications such as the content authoring and publishing application, the digital content viewing application, and multimedia management application of some embodiments operate on mobile devices, such as smart phones (e.g., iPhones®), tablets and touchpads (e.g., iPads®), or ebook readers (e.g., Kindle®). FIG. 22 is an example of an architecture 2200 of such a mobile computing device. As shown, the mobile computing device 2200 includes one or more processing units 2205, a memory interface 2210 and a peripherals interface 2215.

The peripherals interface 2215 is coupled to various sensors and subsystems, including a camera subsystem 2220, a wireless communication subsystem(s) 2225, an audio subsystem 2230, an I/O subsystem 2235, etc. The peripherals interface 2215 enables communication between the processing units 2205 and various peripherals. For example, an orientation sensor 2245 (e.g., a gyroscope) and an acceleration sensor 2250 (e.g., an accelerometer) are coupled to the peripherals interface 2215 to facilitate orientation and acceleration functions.

The camera subsystem 2220 is coupled to one or more optical sensors 2240 (e.g., a charged coupled device (CCD) optical sensor, a complementary metal-oxide-semiconductor (CMOS) optical sensor, etc.). The camera subsystem 2220 coupled with the optical sensors 2240 facilitates camera functions, such as image and/or video data capturing. The wireless communication subsystem 2225 serves to facilitate communication functions. In some embodiments, the wireless communication subsystem 2225 includes radio frequency receivers and transmitters, and optical receivers and transmitters (not shown in FIG. 22). These receivers and transmitters of some embodiments are implemented to operate over one or more communication networks such as a GSM network, a Wi-Fi network, a Bluetooth network, etc. The audio subsystem 2230 is coupled to a speaker to output audio (e.g., to output user-specific questions for generating the escrow key). Additionally, the audio subsystem 2230 is coupled to a microphone to facilitate voice-enabled functions, such as voice recognition (e.g., for searching), digital recording, etc.

The I/O subsystem 2235 involves the transfer between input/output peripheral devices, such as a display, a touch screen, etc., and the data bus of the processing units 2205 through the peripherals interface 2215. The I/O subsystem 2235 includes a touch-screen controller 2255 and other input controllers 2260 to facilitate the transfer between input/output peripheral devices and the data bus of the processing units 2205. As shown, the touch-screen controller 2255 is coupled to a touch screen 2265. The touch-screen controller 2255 detects contact and movement on the touch screen 2265 using any of multiple touch sensitivity technologies. The other input controllers 2260 are coupled to other input/control devices, such as one or more buttons. Some embodiments include a near-touch sensitive screen and a corresponding controller that can detect near-touch interactions instead of or in addition to touch interactions.

The memory interface 2210 is coupled to memory 2270. In some embodiments, the memory 2270 includes volatile memory (e.g., high-speed random access memory), non-volatile memory (e.g., flash memory), a combination of volatile and non-volatile memory, and/or any other type of memory. As illustrated in FIG. 22, the memory 2270 stores an operating system (OS) 2272. The OS 2272 includes instructions for handling basic system services and for performing hardware dependent tasks.

The memory 2270 also includes communication instructions 2274 to facilitate communicating with one or more additional devices; graphical user interface instructions 2276 to facilitate graphic user interface processing; image processing instructions 2278 to facilitate image-related processing and functions; input processing instructions 2280 to facilitate input-related (e.g., touch input) processes and functions; audio processing instructions 2282 to facilitate audio-related processes and functions; and camera instructions 2284 to facilitate camera-related processes and functions. The instructions described above are merely exemplary and the memory 2270 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 22 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 22 may be split into two or more integrated circuits.

B. Computer System

Figure 23:
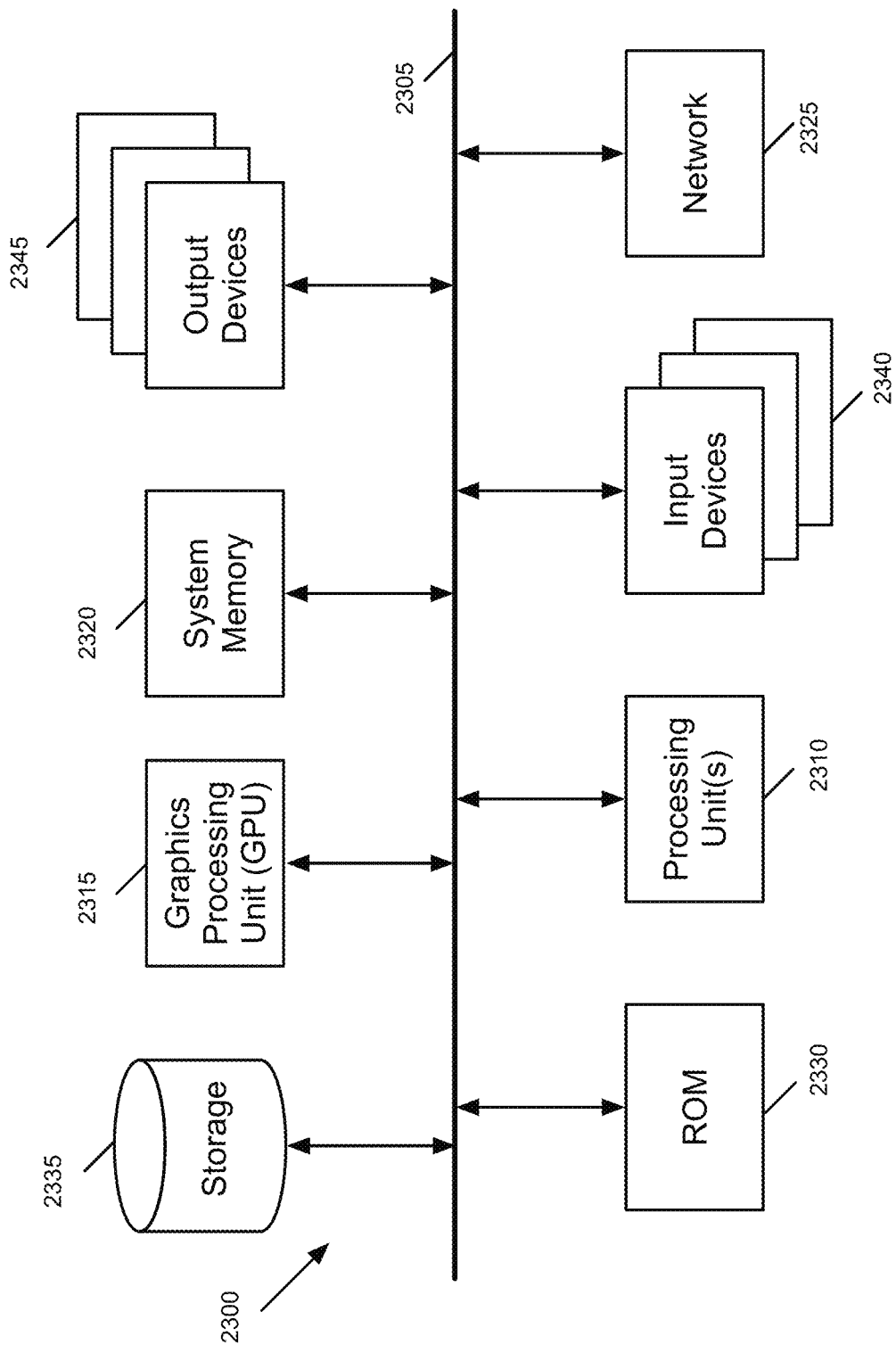
FIG. 23 conceptually illustrates an electronic system with which some embodiments of the invention are implemented.

FIG. 23 conceptually illustrates an electronic system 2300 with which some embodiments of the invention are implemented. The electronic system 2300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2300 includes a bus 2305, processing unit(s) 2310, a graphics processing unit (GPU) 2315, a system memory 2320, a network 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the GPU 2315, the system memory 2320, and the permanent storage device 2335.

From these various memory units, the processing unit(s) 2310 retrieves instructions to execute and data to process in order to execute the processes of the invention. The processing unit(s) may be a single processor or a multi-core processor in different embodiments. Some instructions are passed to and executed by the GPU 2315. The GPU 2315 can offload various computations or complement the image processing provided by the processing unit(s) 2310.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash memory device, etc., and its corresponding disk drive) as the permanent storage device. Like the permanent storage device 2335, the system memory 2320 is a read-and-write memory device. However, unlike storage device 2335, the system memory 2320 is a volatile read-and-write memory, such a random access memory. The system memory 2320 stores some of the instructions and data that the processor needs at runtime. In some embodiments, the invention's processes are stored in the system memory 2320, the permanent storage device 2335, and/or the read-only memory 2330. For example, the various memory units include instructions for processing multimedia clips in accordance with some embodiments. From these various memory units, the processing unit(s) 2310 retrieves instructions to execute and data to process in order to execute the processes of some embodiments.

The bus 2305 also connects to the input and output devices 2340 and 2345. The input devices 2340 enable the user to communicate information and select commands to the electronic system. The input devices 2340 include alpha-numeric keyboards and pointing devices (also called "cursor control devices"), cameras (e.g., webcams), microphones or similar devices for receiving voice commands, etc. The output devices 2345 display images generated by the electronic system or otherwise output data. The output devices 2345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 23, bus 2305 also couples electronic system 2300 to a network 2325 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4A-4C, 11A-11C, 12A-12B, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method, comprising:
at an electronic device with a display and one or more input devices:
displaying, on the display, an update user interface that includes representations of a plurality of system software updates and representations of one or more of a plurality of application updates, wherein:
the representations of the one or more of the plurality of application updates are visually segregated from the plurality of system software updates;
a first representation of the one or more of the plurality of application updates is displayed concurrently with a first update button for updating a first application with one of the one or more of the plurality of application updates, wherein the first update button is displayed at a first location in the update user interface;
a second representation of the plurality of system software updates is displayed concurrently with a second update button for updating the system software of the electronic device with the plurality of system software updates, wherein the second update button is displayed at a second location in the update user interface that is different from the first location in the update user interface;
the first update button is different from the second update button; and
the first update button is displayed concurrently with the second update button;
while displaying the update user interface, receiving a selection of a respective update button displayed in the update user interface; and
in response to receiving selection of the respective update button:
in accordance with a determination that the respective update button that was selected is the first update button, initiating a process for updating the first application without updating the system software; and
in accordance with a determination that the respective update button that was selected is the second update button, initiating a process for updating the system software with the plurality of system software updates without updating the first application.

2. The method of claim 1, wherein an update-all button is displayed on the display for updating the plurality of system software updates and the plurality of application updates at once.

3. The method of claim 1, wherein:
the plurality of system software updates include a plurality of security updates; and
representations of the plurality of security updates, the representations of the plurality of system software updates, and the representations of the one or more of the plurality of application updates are visually segregated.

4. The method of claim 3, wherein:
a security-update button is displayed on the display for updating the plurality of security updates at once.

5. The method of claim 1, wherein a count of the plurality of system software updates and the plurality of application updates is displayed on the display.

6. The method of claim 1, wherein an option is displayed on the display for viewing more application updates of the plurality of application updates.

7. A non-transitory computer readable storage medium storing one or more programs, the one or more programs comprising instructions, which when executed by an electronic device with a display and one or more input devices, cause the electronic device to:
- display, on the display, an update user interface that includes representations of a plurality of system software updates and representations of one or more of a plurality of application updates, wherein:
  - the representations of the one or more of the plurality of application updates are visually segregated from the plurality of system software updates;
  - a first representation of the one or more of the plurality of application updates is displayed concurrently with a first update button for updating a first application with one of the one or more of the plurality of application updates, wherein the first update button is displayed at a first location in the update user interface;
  - a second representation of the plurality of system software updates is displayed concurrently with a second update button for updating the system software of the electronic device with the plurality of system software updates, wherein the second update button is displayed at a second location in the update user interface that is different from the first location in the update user interface;
  - the first update button is different from the second update button; and
  - the first update button is displayed concurrently with the second update button;
- while displaying the update user interface, receive a selection of a respective update button displayed in the update user interface; and
- in response to receiving selection of the respective update button:
  - in accordance with a determination that the respective update button that was selected is the first update button, initiate a process for updating the first application without updating the system software; and
  - in accordance with a determination that the respective update button that was selected is the second update button, initiate a process for updating the system software with the plurality of system software updates without updating the first application.

8. The computer readable storage medium of claim 7, wherein an update-all button is displayed on the display for updating the plurality of system software updates and the plurality of application updates at once.

9. The computer readable storage medium of claim 7, wherein:
- the plurality of system software updates include a plurality of security updates; and
- representations of the plurality of security updates, the representations of the plurality of system software updates, and the representations of the one or more of the plurality of application updates are visually segregated.

10. The computer readable storage medium of claim 9, wherein:
- a security-update button is displayed on the display for updating the plurality of security updates at once.

11. The computer readable storage medium of claim 7, wherein a count of the plurality of system software updates and the plurality of application updates is displayed on the display.

12. The computer readable storage medium of claim 7, wherein an option is displayed on the display for viewing more application updates of the plurality of application updates.

13. An electronic device, comprising:
- a display;
- one or more input devices;
- one or more processors;
- memory; and
- one or more programs, wherein the one or more programs are stored in the memory and configured to be executed by the one or more processors, the one or more programs including instructions for:
  - displaying, on the display, an update user interface that includes representations of a plurality of system software updates and representations of one or more of a plurality of application updates, wherein:
    - the representations of the one or more of the plurality of application updates are visually segregated from the plurality of system software updates;
    - a first representation of the one or more of the plurality of application updates is displayed concurrently with a first update button for updating a first application with one of the one or more of the plurality of application updates, wherein the first update button is displayed at a first location in the update user interface;
    - a second representation of the plurality of system software updates is displayed concurrently with a second update button for updating the system software of the electronic device with the plurality of system software updates, wherein the second update button is displayed at a second location in the update user interface that is different from the first location in the update user interface;
    - the first update button is different from the second update button; and
    - the first update button is displayed concurrently with the second update button;
  - while displaying the update user interface, receiving a selection of a respective update button displayed in the update user interface; and
  - in response to receiving selection of the respective update button:
    - in accordance with a determination that the respective update button that was selected is the first update button, initiating a process for updating the first application without updating the system software; and
    - in accordance with a determination that the respective update button that was selected is the second update button, initiating a process for updating the system software with the plurality of system software updates without updating the first application.

14. The electronic device of claim 13, wherein an update-all button is displayed on the display for updating the plurality of system software updates and the plurality of application updates at once.

15. The electronic device of claim 13, wherein:
- the plurality of system software updates include a plurality of security updates; and
- representations of the plurality of security updates, the representations of the plurality of system software updates, and the representations of the one or more of the plurality of application updates are visually segregated.

16. The electronic device of claim 15, wherein:
a security-update button is displayed on the display for updating the plurality of security updates at once.

17. The electronic device of claim 13, wherein a count of the plurality of system software updates and the plurality of application updates is displayed on the display.

18. The electronic device of claim 13, wherein an option is displayed on the display for viewing more application updates of the plurality of application updates.

\* \* \* \* \*